United States Patent
Banshoya et al.

(10) Patent No.: US 9,975,545 B2
(45) Date of Patent: May 22, 2018

(54) HYBRID VEHICLE

(71) Applicant: TOYOTA JIDOSHA KABUSHIKI KAISHA, Toyota-shi, Aichi-ken (JP)

(72) Inventors: Hidehiko Banshoya, Toyota (JP); Kiyonori Takagi, Okazaki (JP); Atsushi Kawamoto, Toyota (JP); Haruhisa Suzuki, Nagoya (JP); Tatsuya Imamura, Okazaki (JP); Toshiki Kanada, Anjo (JP); Atsushi Tabata, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days. days.

(21) Appl. No.: 15/547,038

(22) PCT Filed: Feb. 16, 2016

(86) PCT No.: PCT/IB2016/000137
§ 371 (c)(1),
(2) Date: Jul. 27, 2017

(87) PCT Pub. No.: WO2016/132203
PCT Pub. Date: Aug. 25, 2016

(65) Prior Publication Data
US 2018/0015916 A1 Jan. 18, 2018

(30) Foreign Application Priority Data
Feb. 18, 2015 (JP) .................................. 2015-029431

(51) Int. Cl.
*F16H 3/72* (2006.01)
*B60W 20/20* (2016.01)
(Continued)

(52) U.S. Cl.
CPC ............. *B60W 20/20* (2013.01); *B60K 6/365* (2013.01); *B60K 6/387* (2013.01); *B60K 6/445* (2013.01);
(Continued)

(58) Field of Classification Search
CPC ............ F16H 3/728; F16H 2200/2007; B60W 10/02; B60W 10/06; B60W 10/08;
(Continued)

(56) References Cited

U.S. PATENT DOCUMENTS

2008/0009380 A1* 1/2008 Iwanaka ................. B60K 6/365
475/5
2008/0242464 A1* 10/2008 Kumazaki ............. F16D 48/066
475/136
(Continued)

FOREIGN PATENT DOCUMENTS

EP 1 728 666 A1 12/2006
JP 2012-071699 A 4/2012
(Continued)

*Primary Examiner* — Edwin A Young
(74) *Attorney, Agent, or Firm* — Oliff PLC

(57) ABSTRACT

A hybrid vehicle includes an engine (10), a first motor generator (MG1), a second motor generator (MG2), a transmission unit (power transmission unit) (40), a differential unit (50), a clutch (CS) and a mechanical oil pump (501). The hybrid vehicle is able to switch between series-parallel mode in which power of the engine is transmitted via the transmission unit and the differential unit and series mode in which power of the engine is transmitted via the clutch. The differential unit (50) is a planetary gear mechanism including a sun gear (S2) connected to the first motor generator (MG1), a ring gear (R2) connected to the second motor generator (MG2), and a carrier (CA2) connected to a ring gear (R1) that is an output element of the transmission unit
(Continued)

(40). The mechanical oil pump (501) is driven by power that is transmitted from the carrier (CA2) of the differential unit.

4 Claims, 13 Drawing Sheets

(51) Int. Cl.

| | | |
|---|---|---|
| *B60K 6/365* | (2007.10) | |
| *B60K 6/387* | (2007.10) | |
| *B60W 10/06* | (2006.01) | |
| *B60W 10/08* | (2006.01) | |
| *B60W 10/02* | (2006.01) | |
| *B60W 10/105* | (2012.01) | |
| *F16H 61/00* | (2006.01) | |
| *F16H 37/08* | (2006.01) | |
| *B60K 6/543* | (2007.10) | |
| *B60K 6/445* | (2007.10) | |

(52) U.S. Cl.
CPC ............ *B60K 6/543* (2013.01); *B60W 10/02* (2013.01); *B60W 10/06* (2013.01); *B60W 10/08* (2013.01); *B60W 10/105* (2013.01); *F16H 3/728* (2013.01); *F16H 37/084* (2013.01); *F16H 61/0031* (2013.01); *B60W 2510/0666* (2013.01); *B60W 2510/081* (2013.01); *B60W 2510/1035* (2013.01); *B60W 2710/021* (2013.01); *B60W 2710/0605* (2013.01); *B60W 2710/0666* (2013.01); *B60W 2710/081* (2013.01); *B60W 2710/083* (2013.01); *B60W 2710/086* (2013.01); *B60W 2710/1061* (2013.01); *B60Y 2200/92* (2013.01); *B60Y 2400/303* (2013.01); *B60Y 2400/304* (2013.01); *B60Y 2400/308* (2013.01); *F16H 2037/0873* (2013.01); *F16H 2200/2007* (2013.01); *Y10S 903/911* (2013.01); *Y10S 903/918* (2013.01); *Y10S 903/93* (2013.01); *Y10S 903/945* (2013.01); *Y10S 903/946* (2013.01)

(58) Field of Classification Search
CPC ....... B60W 10/30; B60W 20/20; B60K 6/365; B60K 6/387; B60K 6/445
See application file for complete search history.

(56) References Cited

U.S. PATENT DOCUMENTS

| | | | |
|---|---|---|---|
| 2009/0074590 A1* | 3/2009 | Tsuda | B60W 10/30 |
| | | | 417/3 |
| 2010/0075798 A1* | 3/2010 | Suzuki | B60K 6/40 |
| | | | 477/5 |
| 2015/0021110 A1 | 1/2015 | Ono et al. | |
| 2015/0211620 A1 | 7/2015 | Matsubara et al. | |
| 2015/0251530 A1* | 9/2015 | Okuda | B60K 6/365 |
| | | | 180/65.235 |
| 2015/0273998 A1 | 10/2015 | Kiyokami et al. | |

FOREIGN PATENT DOCUMENTS

| | | |
|---|---|---|
| WO | 2013/114594 A1 | 8/2013 |
| WO | 2014/013556 A1 | 1/2014 |
| WO | 2014/091586 A1 | 6/2014 |

* cited by examiner

FIG. 5

| | TRAVELING STATE | | | | C1 | B1 | CS | MG1 | MG2 |
|---|---|---|---|---|---|---|---|---|---|
| E1 | EV MODE | FORWARD /REVERSE | ONE-MOTOR | DURING DRIVING | × | × | × |  | M |
| E2 | EV MODE | FORWARD /REVERSE | ONE-MOTOR | DURING ENGINE BRAKE | △ | △ | × | M | G |
| E3 | EV MODE | FORWARD /REVERSE | TWO-MOTOR | Ne=0 | ○ | ○ | × | M | M |
| H1 | HV MODE | SERIES-PARALLEL MODE | FORWARD | HIGH GEAR | × | ○ | × | G | M |
| H2 | HV MODE | SERIES-PARALLEL MODE | FORWARD | LOW GEAR | ○ | × | × | G | M |
| H3 | HV MODE | SERIES-PARALLEL MODE | REVERSE | LOW GEAR | ○ | × | × | G | M |
| H4 | HV MODE | SERIES MODE | FORWARD |  | × | × | ○ | G | M |
| H5 | HV MODE | SERIES MODE | REVERSE |  | × | × | ○ | G | M |

○ : ENGAGED   △ : ANY ONE IS ENGAGED WHILE USING ENGINE BRAKE IN COMBINATION   × : RELEASED
G : MAINLY GENERATION   M : MAINLY MOTOR; HOWEVER, GENERATOR DURING REGENERATION

〈HV (SERIES-PARALLEL MODE)〉

HYBRID VEHICLE

BACKGROUND OF THE INVENTION

1. Field of the Invention

The invention relates to a hybrid vehicle.

2. Description of Related Art

There is known a hybrid vehicle including not only an engine, two rotary electric machines (first rotary electric machine and second rotary electric machine) and a differential unit (power split mechanism) but also a transmission unit (power transmission unit) between the engine and the differential unit.

A vehicle described in International Application Publication No. 2013/114594 is able to switch between motor drive mode (hereinafter, referred to as EV mode) and hybrid mode (hereinafter, referred to as HV mode). In motor drive mode, the engine is stopped, and the power of the second rotary electric machine is used. In hybrid mode, the power of both the engine and the second rotary electric machine is used. A series-parallel mode drive system is employed as an HV drive system. In series-parallel mode, the power of the engine is transmitted to the first rotary electric machine and is used to generate electric power, while part of the power of the engine is also transmitted to drive wheels via the differential unit.

There is also known a series mode drive system as an HV drive system. In the series mode drive system, electric power is generated by using the power of an engine, and a motor is driven by using the generated electric power. In this series mode, the power of the engine is not transmitted to drive wheels.

The vehicle described in International Application Publication No. 2013/114594 is not configured to be able to travel in series mode because the power of the engine is also transmitted to the drive wheels via the differential unit at the time when the power of the engine is transmitted to the first rotary electric machine.

It is conceivable to provide a second path that directly transmits the power of the engine to the first rotary electric machine in addition to a first path that transmits the power of the engine to the first rotary electric machine via the transmission unit (power transmission unit) and the differential unit and then a clutch is provided in the second path. With this configuration, it is possible to select one of the series-parallel mode and the series mode. Specifically, it is possible to select the series-parallel mode by transmitting the power of the engine through the first path (that is, placing the transmission unit provided in the first path in a power transmitting state and releasing the clutch provided in the second path). On the other hand, it is possible to select the series mode by transmitting the power of the engine through the second path (that is, placing the transmission unit provided in the first path in a neutral state and engaging the clutch provided in the second path).

In the above configuration, a mechanical oil pump is connected to any location in a power transmission path from the engine to the drive wheels, and hydraulic pressure for activating the transmission unit provided in the first path and the clutch provided in the second path is allowed to be generated by the mechanical oil pump.

However, for example, in the case where the mechanical oil pump is connected to an input shaft of the transmission unit (power transmission unit), when the engine is stopped, rotation of the input shaft of the transmission unit connected to an output shaft of the engine is also stopped, so it is not possible to activate the mechanical oil pump.

SUMMARY OF THE INVENTION

The invention is directed to, in a hybrid vehicle that is able to select one of series-parallel mode and series mode, a mechanical oil pump is allowed to be activated in a state where an engine is stopped.

An aspect of the invention provides a hybrid vehicle. The hybrid vehicle includes an internal combustion engine, a first rotary electric machine, a second rotary electric machine, a power transmission unit, a clutch and a mechanical oil pump. The second rotary electric machine is configured to output power to a drive wheel. The power transmission unit includes an input element, an output element and an engaging portion. The input element is configured to receive power from the internal combustion engine. The output element is configured to output power input to the input element. The engaging portion is configured, to switch between a non-neutral state where power is transmitted between the input element and the output element and a neutral state where power is not transmitted between the input element and the output element. The differential unit includes a first rotating element, a second rotating element and a third rotating element. The first rotating element is connected to the first rotary electric machine. The second rotating element is connected to the second rotary electric machine and the drive wheel. The third rotating element is connected to the output element. The differential unit is configured such that, when rotation speeds of any two of the first rotating element, the second rotating element and the third rotating element are determined, a rotation speed of the remaining one of the first rotating element, the second rotating element and the third rotating element is determined. The clutch is configured to switch between an engaged state where power is transmitted from the internal combustion engine to the first rotary electric machine and a released state where transmission of power from the internal combustion engine to the first rotary electric machine is interrupted. Power from the internal combustion engine is transmitted to the first rotary electric machine though at least one of a first path or a second path. The first path is a path through which power is transmitted from the internal combustion engine to the first rotary electric machine via the power transmission unit and the differential unit. The second path is a path through which power is transmitted from the internal combustion engine to the first rotary electric machine via a path different from the first path. The clutch is provided in the second path. The mechanical oil pump is configured to generate hydraulic pressure for activating the power transmission unit and the clutch. The mechanical oil pump is configured to be driven by power that is transmitted from any one of the first rotating element, second rotating element and third rotating element of the differential unit.

With the thus configured hybrid vehicle, it is possible to select one of the series-parallel mode and the series mode by controlling the power transmission unit provided in the first path and the clutch provided in the second path. In addition, the mechanical oil pump is driven by power that is transmitted from not the input element of the power transmission unit but any one of the first rotating element, second rotating element and third rotating element of the differential unit. The first rotating element, second rotating element and third rotating element of the differential unit are rotatable even in a state where rotation of the input element of the power transmission unit is stopped as a result of a stop of the internal combustion engine. Therefore, in the hybrid vehicle that is able to select one of the series-parallel mode and the series mode, it is possible to operate the mechanical oil pump in a state where the engine is stopped.

In the hybrid vehicle, the differential unit may be a planetary gear including a sun gear, a ring gear, pinions that are in mesh with the sun gear and the ring gear, and a carrier that supports the pinions such that the pinions are rotatable. The first rotating element, the second rotating element and the third rotating element may be respectively the sun gear, ring gear and carrier of the planetary gear. The mechanical oil pump may be connected to the carrier. The mechanical oil pump may be configured to be driven by power that is transmitted from the carrier.

With the thus configured hybrid vehicle, because the mechanical oil pump is connected to the carrier of the differential unit, it is possible to simplify the configuration around the mechanical oil pump. That is, for example, when the mechanical oil pump is connected to the ring gear connected to the drive wheel, a reverse rotation prevention device (one-way clutch, or the like) for preventing reverse rotation of the mechanical oil pump is required in the case where the ring gear rotates in the reverse direction at the time when the vehicle moves backward. However, when the mechanical oil pump is connected to the ring gear of the differential unit, such a reverse rotation prevention device is not required, so it is possible to simplify the configuration around the mechanical oil pump.

The hybrid vehicle may further include an electric oil pump and a controller. The electric oil pump may be configured to generate hydraulic pressure for activating the power transmission unit and the clutch. The controller may be configured to control the electric oil pump. The controller may be configured to, at the time of switching from series-parallel mode to series mode, change a rotation speed of the electric oil pump based on whether a rotation speed of the internal combustion engine is lower than a rotation speed of the first rotary electric machine. The series-parallel, mode may be a mode in which the hybrid vehicle travels in a state where the power transmission unit is placed in the non-neutral state and the clutch is placed in the released state. The series mode may be a mode in which the hybrid vehicle travels in a state where the power transmission unit is placed in the neutral state and the clutch is placed in the engaged state.

With the thus configured hybrid vehicle, at the time of switching from the series-parallel mode to the series mode, when the rotation speed of the internal combustion engine is lower than or higher than the rotation speed of the first rotary electric machine, a temporal change in rotation of the mechanical oil pump occurs. An increase or reduction in hydraulic pressure resulting from a temporal change in rotation of the mechanical oil pump is compensated by hydraulic pressure of the electric oil pump. Therefore, it is possible to supply necessary and sufficient hydraulic pressure even in a period of transition of switching from the series-parallel mode to the series mode.

In the hybrid vehicle, the controller may be configured to, at the time of switching from the series-parallel mode to the series mode, increase the rotation speed of the electric oil pump when the rotation speed of the internal combustion engine is lower than the rotation speed of the first rotary electric machine, and decrease the rotation speed of the electric oil pump when the rotation speed of the internal combustion engine is higher than the rotation speed of the first rotary electric machine.

With the thus configured hybrid vehicle, when the rotation speed of the internal combustion engine is lower than the rotation speed of the first rotary electric machine, the rotation speed of the mechanical oil pump temporarily decreases as a result of switching from the series-parallel mode to the series mode, so the rotation speed of the electric oil pump is increased. On the other hand, when the rotation speed of the internal combustion engine is higher than the rotation speed of the first rotary electric machine, the rotation speed of the mechanical oil pump temporarily increases as a result of switching from the series-parallel mode to the series mode, so the rotation speed of the electric oil pump is decreased. Thus, a temporal increase or reduction in hydraulic pressure of the mechanical oil pump resulting from switching from the series-parallel mode to the series mode is appropriately compensated by hydraulic pressure of the electric oil pump.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 5 is a chart that shows each drive mode in the hybrid vehicle and a controlled status of a transmission unit (power transmission unit);

DETAILED DESCRIPTION OF EMBODIMENTS

Figure 1:
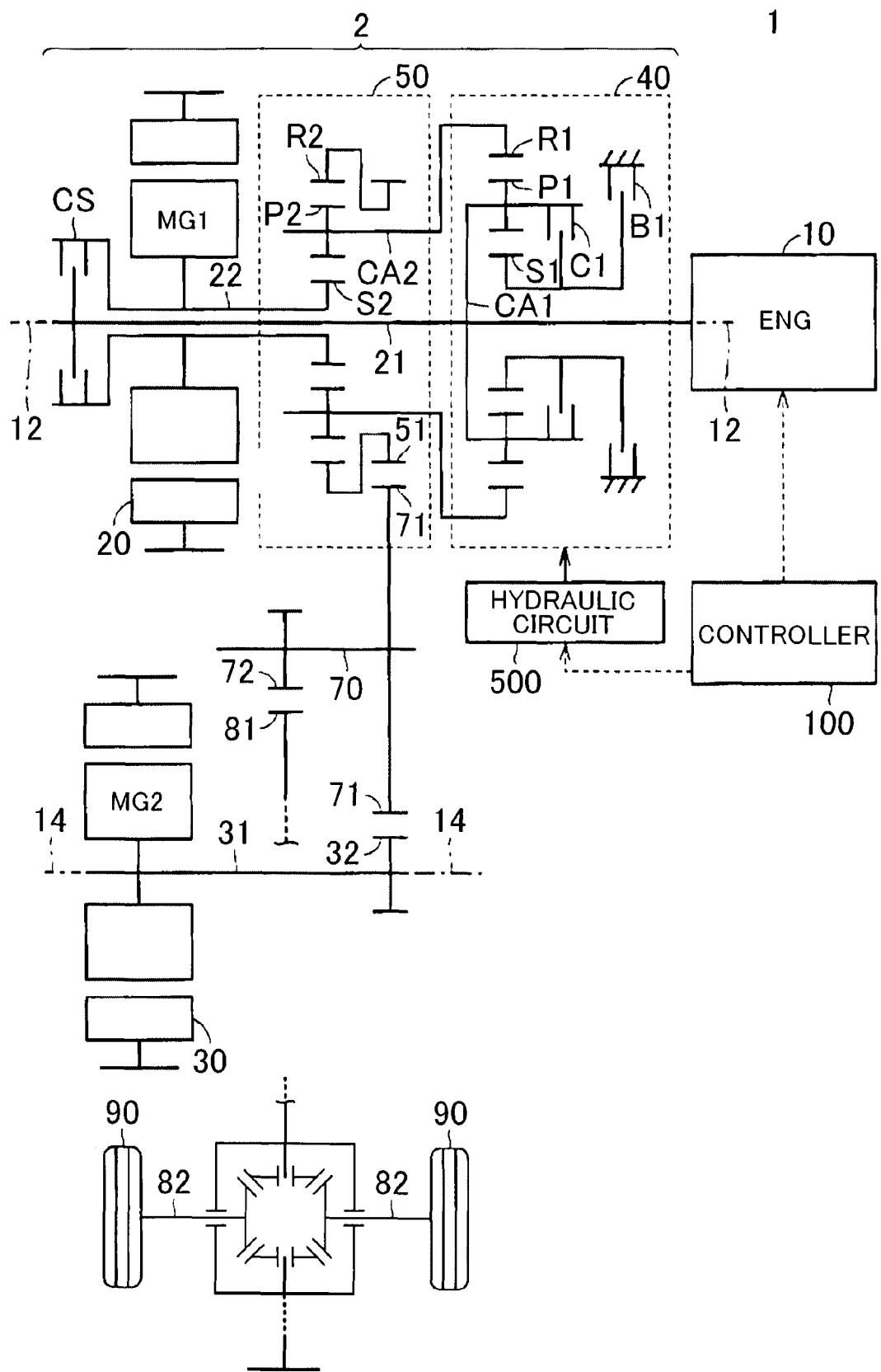
FIG. 1 is a view that shows the overall configuration of a hybrid vehicle according to an embodiment that is an example of the invention.

Hereinafter, an embodiment of the invention will be described with reference to the accompanying drawings. Like reference numerals denote the same or corresponding portions in the following embodiment, and the description thereof will not be repeated.

Initially, the overall configuration of a hybrid vehicle will be described. FIG. 1 is a view that shows the overall configuration of a hybrid vehicle (which may be simply referred to as vehicle) 1 according to the embodiment that is an example of the invention. The hybrid vehicle 1 includes an engine 10, a drive system 2, drive wheels 90 and a controller 100. The drive system 2 includes a first motor generator (hereinafter, referred to as first MG) 20 that is a first rotary electric machine, a second motor generator (hereinafter, referred to as second MG) 30 that is a second rotary electric machine, a transmission unit (power transmission unit) 40, a differential unit 50, a clutch CS, an input shaft 21, a counter shaft 70 that is an output shaft of the drive system 2, a differential gear set 80 and a hydraulic circuit 500.

The vehicle 1 is a front-engine front-drive (FF) hybrid vehicle that travels by using the power of at least any one of the engine 10, the first MG 20 and the second MG 30. The vehicle 1 may be a plug-in hybrid vehicle of which a battery (see FIG. 2) 60 is rechargeable from an external power supply.

The engine 10 is, for example, an internal combustion engine, such as a gasoline engine and a diesel engine. Each of the first MG 20 and the second MG 30 is, for example, a permanent magnet synchronous motor that includes a rotor in which permanent magnets are embedded. The drive system 2 is a double-axis drive system in which the first MG 20 is provided along a first axis 12 coaxial with the crankshaft of the engine 10 and the second MG 30 is provided along a second axis 14 different from the first axis 12. The first axis 12 and the second axis 14 are parallel to each other.

The transmission unit 40, the differential unit 50 and the clutch CS are further provided along the first axis 12. The transmission unit 40, the differential unit 50, the first MG 20 and the clutch CS are arranged from the side close to the engine 10 in the stated order.

The first MG 20 is provided so as to be able to receive power from the engine 10. More specifically, the input shaft 21 of the drive system 2 is connected to the crankshaft of the engine 10. The input shaft 21 extends along the first axis 12 in a direction away from the engine 10. The input shaft 21 is connected to the clutch CS at its distal end extending from the engine 10. A rotary shaft 22 of the first MG 20 extends in a cylindrical shape along the first axis 12. The input shaft 21 passes through the inside of the rotary shaft 22 at a portion before the input shaft 21 is connected to the clutch CS. The input shaft 21 is connected to the rotary shaft 22 of the first MG 20 via the clutch CS.

The clutch CS is a hydraulic friction engagement element that is able to couple the input shaft 21 to the rotary shaft 22 of the first MG 20. When the clutch CS is placed in an engaged state, the input shaft 21 and the rotary shaft 22 are coupled to each other, and the power of the engine 10 is allowed to be directly transmitted to the first MG 20 via the clutch CS. On the other hand, when the clutch CS is placed in a released state, coupling of the input shaft 21 to the rotary shaft 22 is released, and the power of the engine 10 is not allowed to be directly transmitted to the first MG 20 via the clutch CS.

The transmission unit 40 shifts power from the engine 10 and then outputs the power to the differential unit 50. The transmission unit 40 includes a single-pinion-type planetary gear mechanism, a clutch C1 and a brake B1. The single-pinion-type planetary gear mechanism includes a sun gear S1, pinions P1, a ring gear R1 and a carrier CA1.

The sun gear S1 is provided such that the rotation center of the sun gear S1 coincides with the first axis 12. The ring gear R1 is provided coaxially with the sun gear S1 on the radially outer side of the sun gear S1. The pinions P1 are arranged between the sun gear S1 and the ring gear R1, and are in mesh with the sun gear S1 and the ring gear R1. The pinions P1 are rotatably supported by the carrier CA1. The carrier CA1 is connected to the input shaft 21, and rotates integrally with the input shaft 21. Each of the pinions P1 is provided so as to be revolvable about the first axis 12 and rotatable around the central axis of the pinion P1.

As will be described later, the rotation speed of the sun gear S1, the rotation speed of the carrier CA1 (that is, the rotation speed of the engine 10) and the rotation speed of the ring gear R1 are in the relationship represented by points that are connected by a straight line in each of the nomographs (that is, the relationship that, when any two rotation speeds are determined, the remaining one rotation speed is also determined).

In the present embodiment, the carrier CA1 is provided as an input element to which power is input from the engine 10, and the ring gear R1 is provided as an output element that outputs the power input to the carrier CA1. By the use of the planetary gear mechanism including the sun gear S1, the pinions P1, the ring gear R1 and the carrier CA1, power input to the carrier CA1 is shifted and output from the ring gear R1.

The clutch C1 is a hydraulic friction engagement element that is able to couple the sun gear S1 to the carrier CA1. When the clutch C1 is placed in an engaged state, the sun gear S1 and the carrier CA1 rotate integrally with each other. When the clutch C1 is placed in a released state, integral rotation of the sun gear S1 and the carrier CA1 is cancelled.

The brake B1 is a hydraulic friction engagement element that is able to restrict (lock) the rotation of the sun gear S1. When the brake B1 is placed in an engaged state, the sun gear S1 is fixed to the case body of the drive system, and the rotation of the sun gear S1 is restricted. When the brake B1 is placed in a released state (disengaged state), the sun gear S1 is separated from the case body of the drive system, and the rotation of the sun gear S1 is allowed.

A speed ratio (the ratio of the rotation speed of the carrier CA1 that is the input element to the rotation speed of the ring gear R1 that is the output element, specifically, Rotation Speed of Carrier CA1/Rotation Speed of Ring Gear R1) of the transmission unit 40 is changed in response to a combination of the engaged/released states of the clutch C1 and brake B1. When the clutch C1 is engaged and the brake B1 is released, a low gear position Lo in which the speed ratio is 1.0 (directly coupled state) is established. When the clutch C1 is released and the brake B1 is engaged, a high gear position Hi in which the speed ratio is smaller than 1.0 (for example, 0.7, and a so-called over-drive state) is established. When the clutch C1 is engaged and the brake B1 is engaged, the rotation of the sun gear S1 and the rotation of the carrier CA1 are restricted, so the rotation of the ring gear R1 is also restricted.

The transmission unit 40 is configured to be able to switch between a non-neutral state and a neutral state. In the non-neutral state, power is transmitted. In the neutral state, power is not transmitted. In the present embodiment, the above-described directly coupled state and over-drive state correspond to the non-neutral state. On the other hand, when both the clutch C1 and the brake B1 are released, the carrier CA1 is allowed to coast about the first axis 12. Thus, the neutral state in which power transmitted from the engine 10 to the carrier CA1 is not transmitted from the carrier CA1 to the ring gear R1 is obtained.

The differential unit 50 includes a single-pinion-type planetary gear mechanism and a counter drive gear 51. The single-pinion-type planetary gear mechanism includes a sun gear S2, pinions P2, a ring gear R2 and a carrier CA2.

The sun gear S2 is provided such that the rotation center of the sun gear S2 coincides with the first axis 12. The ring gear R2 is provided coaxially with the sun gear S2 on the radially outer side of the sun gear S2. The pinions P2 are arranged between the sun gear S2 and the ring gear R2, and are in mesh with the sun gear S2 and the ring gear R2. The pinions P2 are rotatably supported by the carrier CA2. The carrier CA2 is connected to the ring gear R1 of the transmission unit 40, and rotates integrally with the ring gear R1. Each of the pinions P2 is provided so as to be revolvable about the first axis 12 and rotatable around the central axis of the pinion P2.

The rotary shaft 22 of the first MG 20 is connected to the sun gear S2. The rotary shaft 22 of the first MG 20 rotates integrally with the sun gear S2. The counter drive gear 51 is connected to the ring gear R2. The counter drive gear 51 is an output gear of the differential unit 50. The output gear rotates integrally with the ring gear R2.

As will be described later, the rotation speed of the sun gear S2 (that is, the rotation speed of the first MG 20), the rotation speed of the carrier CA2 and the rotation speed of the ring gear R2 are in the relationship represented by points that are connected by a straight line in each of the nomographs (that is, the relationship that, when any two rotation speeds are determined, the remaining one rotation speed is also determined). Therefore, when the rotation speed of the carrier CA2 is a predetermined value, it is possible to steplessly change the rotation speed of the ring gear R2 by adjusting the rotation speed of the first MG 20.

The counter shaft 70 extends parallel to the first axis 12 and the second axis 14. The counter shaft 70 is arranged parallel to the rotary shaft 22 of the first MG 20 and a rotary shaft 31 of the second MG 30. A driven gear 71 and a drive gear 72 are provided on the counter shaft 70. The driven gear 71 is in mesh with the counter drive gear 51 of the differential unit 50. That is, the power of the engine 10 and the power of the first MG 20 are transmitted to the counter shaft 70 via the counter drive gear 51 of the differential unit 50.

The transmission unit 40 and the differential unit 50 are connected in series with each other in a power transmission path from the engine 10 to the counter shaft 70. Therefore, power from the engine 10 is shifted in the transmission unit 40 and the differential unit 50 and then transmitted to the counter shaft 70.

The driven gear 71 is in mesh with a reduction gear 32 connected to the rotary shaft 31 of the second MG 30. That is, the power of the second MG 30 is transmitted to the counter shaft 70 via the reduction gear 32.

The drive gear 72 is in mesh with a differential ring gear 81 of the differential gear set 80. The differential gear set 80 is connected to the right and left drive wheels 90 via corresponding right and left drive shafts 82. That is, the rotation of the counter shaft 70 is transmitted to the right and left drive shafts 82 via the differential gear set 80.

With the above-described configuration in which the clutch CS is provided, the hybrid vehicle 1 is allowed to operate in a mode in which a series-parallel system is used (hereinafter, referred to as series-parallel mode) and is also allowed to operate in a mode in which a series system is used (hereinafter, referred to as series mode). In terms of this point, how power is transmitted from the engine in each mode will be described with reference to the schematic view shown in FIG. 2.

Figure 2:
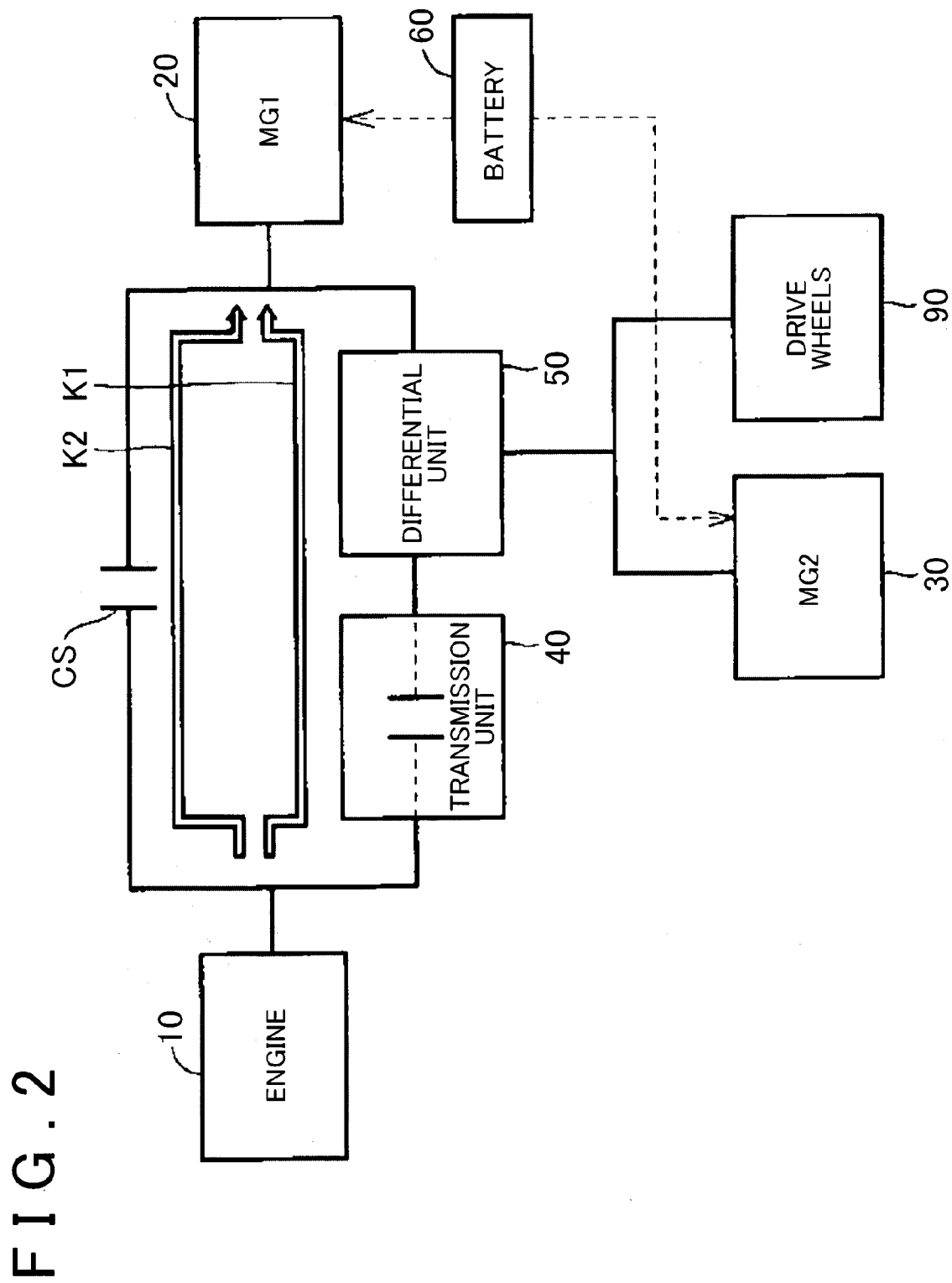
FIG. 2 is a block diagram that schematically shows power transmission paths of the hybrid vehicle shown in FIG. 1.

FIG. 2 is a block diagram that schematically shows power transmission paths of components of the hybrid vehicle shown in FIG. 1. The hybrid vehicle 1 includes the engine 10, the first MG 20, the second MG 30, the transmission unit 40, the differential unit 50, the battery 60 and the clutch CS. The battery 60 supplies electric power to the first MG 20 or the second MG 30 during motoring of a corresponding one of the first MG 20 and the second MG 30, and stores electric power generated by the first MG 20 or the second MG 30 during regeneration of a corresponding one of the first MG 20 and the second MG 30.

The hybrid vehicle 1 includes two paths K1, K2 as a path through which the power of the engine 10 is transmitted to the first MG 20.

The path K1 is a path through which the power of the engine 10 is transmitted to the first MG 20 via the transmission unit 40 and the differential unit 50. When the transmission unit 40 is placed in a non-neutral state (any one of the clutch C1 and the brake B1 is placed in the engaged state, and the other one of the clutch C1 and the brake B1 is placed in the released state), the power of the engine 10 is transmitted to the first MG 20 through the path K1. On the other hand, when the transmission unit 40 is placed in a neutral state (both the clutch C1 and the brake B1 are placed in the released state), transmission of power through the path K1 is interrupted.

The path K2 is different from the path K1, and is a path through which the power of the engine 10 is directly transmitted to the first MG 20 without passing through the transmission unit 40 or the differential unit 50. The clutch CS is provided in the path K2. When the clutch CS is placed in the engaged state, the power of the engine 10 is transmitted to the first MG 20 through the path K2. On the other hand, when the clutch CS is placed in the released state, transmission of power through the path K2 is interrupted.

In HV mode in which the engine 10 is operated, when the power of the engine 10 is transmitted through the path K1 and the path K2 is interrupted (that is, the transmission unit 40 is placed in the non-neutral state and the clutch CS is placed in the released state), the hybrid vehicle 1 is operable in series-parallel mode.

On the other hand, in HV mode in which the engine 10 is operated, when the power of the engine 10 is transmitted through the path K2 and the path K1 is interrupted (that is, the transmission unit 40 is placed in the neutral state and the clutch CS is placed in the engaged state), the hybrid vehicle 1 is operable in series mode. At this time, in the differential unit 50, the carrier CA2 connected to the transmission unit 40 is freely rotatable (free), so the sun gear S2 connected to the first MG 20 and the ring gear R2 connected to the second MG 30 do not influence each other and are rotatable. Therefore, it is possible to independently perform the operation of generating electric power by rotating the first MG 20 with the use of the rotation of the engine 10 and the operation of rotating the drive wheels by driving the second MG 30.

The transmission unit 40 does not always need to be able to change the speed ratio. As long as it is possible to interrupt transmission of power through the path K1, a mere clutch is applicable.

Figure 3:
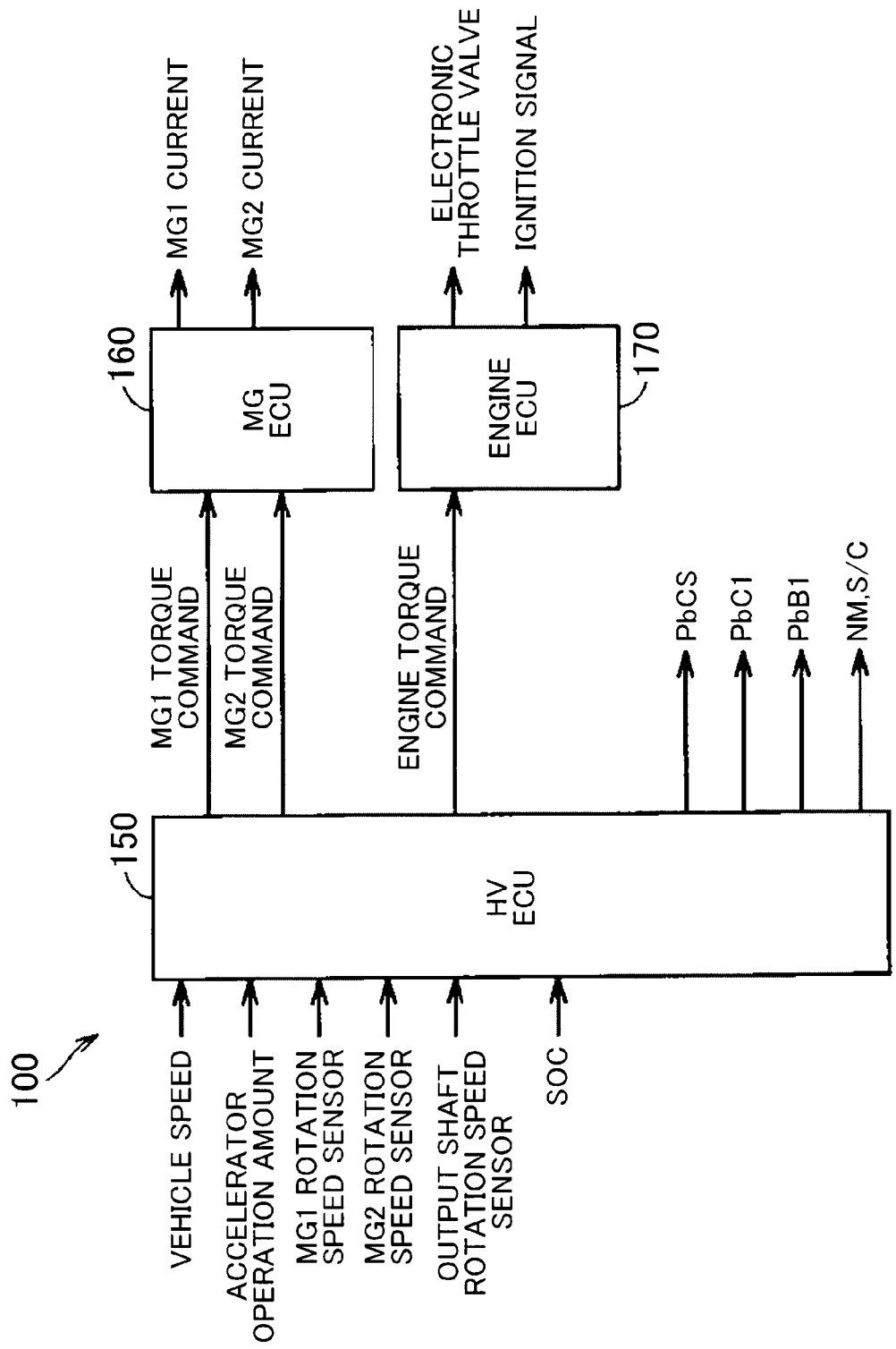
FIG. 3 is a block diagram that shows the configuration of a controller for the hybrid vehicle shown in FIG. 1.

The configuration of the controller will be described below. FIG. 3 is a block diagram that shows the configuration of the controller 100 of the hybrid vehicle 1 shown in FIG. 1. The controller 100 includes an HV ECU 150, an MG ECU 160 and an engine ECU 170. Each of the HV ECU 150, the MG ECU 160 and the engine ECU 170 is an electronic control unit including a computer. The number of ECUs is not limited to three. An integrated single ECU may be provided as a whole, or two or four or more of divided ECUs may be provided.

The MG ECU 160 controls the first MG 20 and the second MG 30. The MG ECU 160, for example, controls the output torque of the first MG 20 by adjusting the value of current that is supplied to the first MG 20. The MG ECU 160 controls the output torque of the second MG 30 by adjusting the value of current that is supplied to the second MG 30.

The engine ECU 170 controls the engine 10. The engine ECU 170, for example, controls the opening degree of an electronic throttle valve of the engine 10, controls ignition of the engine by outputting an ignition signal, or controls injection of fuel to the engine 10. The engine ECU 170 controls the output torque of the engine 10 through opening degree control over the electronic throttle valve, injection control, ignition control, and the like.

The HV ECU 150 comprehensively controls the entire vehicle. A vehicle speed sensor, an accelerator operation amount sensor, an MG1 rotation speed sensor, an MG2 rotation speed sensor, an output shaft rotation speed sensor, a battery sensor, and the like, are connected to the HV ECU 150. With these sensors, the HV ECU 150 acquires a vehicle speed, an accelerator operation amount, the rotation speed of the first MG 20, the rotation speed of the second MG 30, the rotation speed of the output shaft of a power transmission system, a battery state SOC, and the like.

The HV ECU 150 calculates a required driving force, a required power, a required torque, and the like, for the vehicle based on acquired information. The HV ECU 150 determines the output torque of the first MG 20 (hereinafter, also referred to as MG1 torque), the output torque of the second MG 30 (hereinafter, also referred to as MG2 torque) and the output torque of the engine 10 (hereinafter, also referred to as engine torque) based on the calculated required values. The HV ECU 150 outputs a command value of the MG1 torque and a command value of the MG2 torque to the MG ECU 160. The HV ECU 150 outputs a command value of the engine torque to the engine ECU 170.

The HV ECU 150 controls the clutches C1, CS and the brake B1 based on the drive mode (described later), and the like. The HV ECU 150 outputs, to the hydraulic circuit 500 shown in FIG. 1, a command value (PbC1) of hydraulic pressure that is supplied to the clutch C1, a command value (PbCS) of hydraulic pressure that is supplied to the clutch CS and a command value (PbB1) of hydraulic pressure that is supplied to the brake B1.

Figure 4:
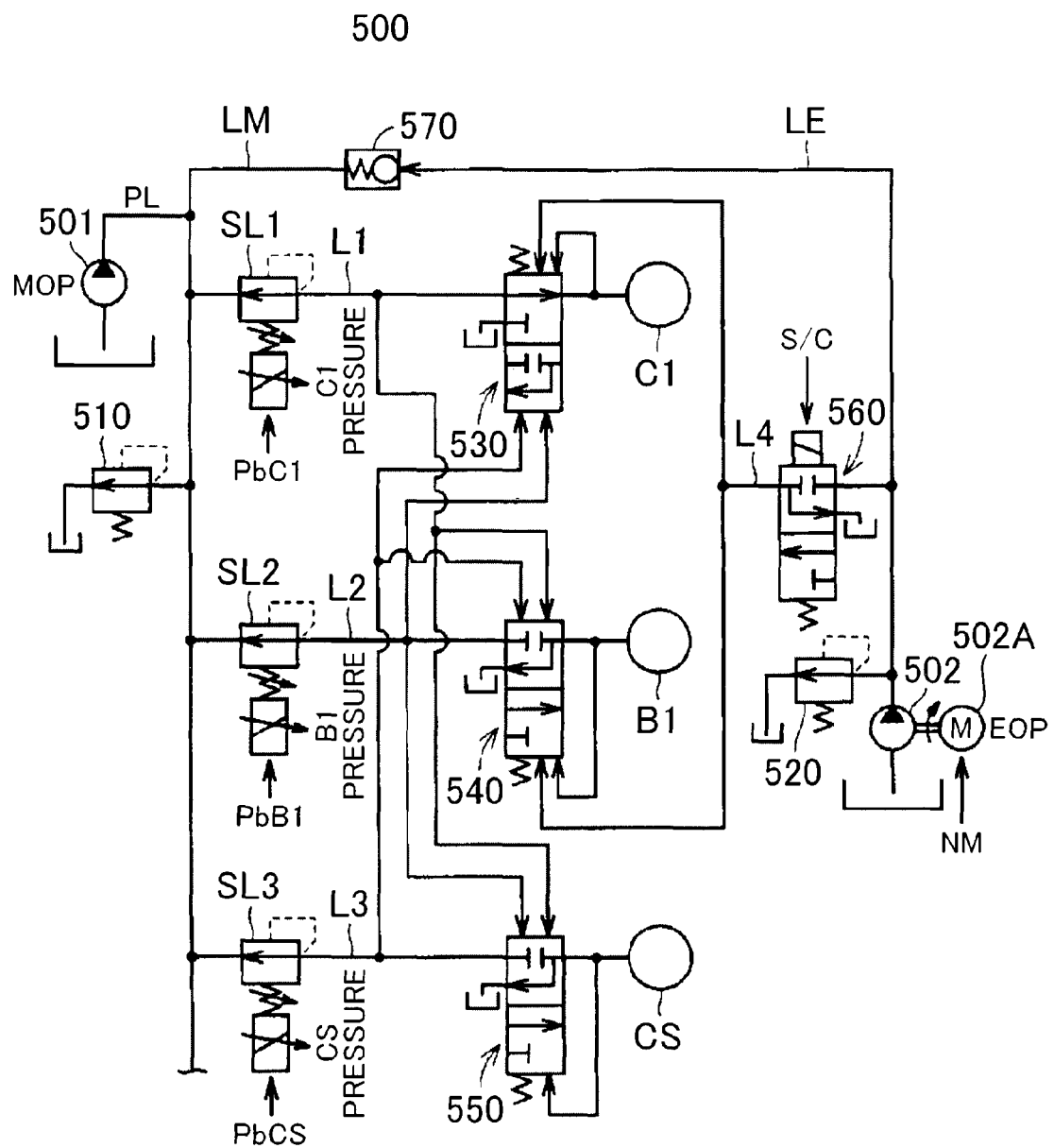
FIG. 4 is a view that schematically shows the configuration of a hydraulic circuit mounted on the hybrid vehicle shown in FIG. 1.

The HV ECU 150 outputs a control signal NM for controlling an electric oil pump 502 (see FIG. 4 (described later)) and a control signal S/C for controlling an electromagnetic switching valve 560 (see FIG. 4 (described later)) to the hydraulic circuit 500 shown in FIG. 1.

Next, the configuration of the hydraulic circuit will be described. FIG. 4 is a view that schematically shows the configuration of the hydraulic circuit 500 mounted on the hybrid vehicle 1. The hydraulic circuit 500 includes a mechanical oil pump (hereinafter, also referred to as MOP) 501, the electric oil pump (hereinafter, also referred to as EOP) 502, pressure regulating valves 510, 520, linear solenoid valves SL1, SL2, SL3, simultaneous supply prevention valves 530, 540, 550, an electromagnetic change-over valve 560, a check valve 570, and oil passages LM, LE, L1, L2, L3, L4.

The MOP 501 is connected to the carrier CA2 among the three rotating elements (sun gear S2, ring gear R2, carrier CA2) that constitute the differential unit 50. More specifically, as shown in FIG. 1, the MOP 501 is connected to the carrier CA2 via a plurality of gears 506, 507. The gear 506 is connected to the carrier CA2 of the differential unit 50, and rotates integrally with the carrier CA2 around a first axis 12. The gear 507 is provided on the radially outer side of the gear 506, and is in mesh with the gear 506. A rotary shaft 508 of the gear 507 is connected to a drive shaft of the MOP 501 arranged coaxially with the rotary shaft 508. With the above configuration, rotation of the carrier CA2 of the differential unit 50 is transmitted to the drive shaft of the MOP 501 through the gear 506 and the gear 507.

The MOP 501 is operated by power that is transmitted from the carrier CA2 of the differential unit 50 to generate hydraulic pressure. Therefore, when the carrier CA2 is rotated, the MOP 501 is also operated; whereas, when the carrier CA2 is stopped, the MOP 501 is also stopped. The MOP 501 outputs generated hydraulic pressure to the oil passage LM.

One of the most characteristic points of the hydraulic circuit 500 according to the present embodiment is that the MOP 501 is connected to not the carrier CA1 of the transmission unit 40 but the carrier CA2 of the differential unit 50. Thus, it is possible to operate the MOP 501 even in a state where rotation of the carrier CA1 of the transmission unit 40 is stopped as a result of a stop of the engine 10. This point will be described in detail later.

The hydraulic pressure in the oil passage LM is regulated (reduced) to a predetermined pressure by the pressure regulating valve 510. Hereinafter, the hydraulic pressure in the oil passage LM, regulated by the pressure regulating valve 510, is also referred to as line pressure PL. The line pressure PL is supplied to each of the linear solenoid valves SL1, SL2, SL3.

The linear solenoid valve SL1 generates hydraulic pressure for engaging the clutch C1 (hereinafter, referred to as C1 pressure) by regulating the line pressure PL in response to the hydraulic pressure command value PbC1 from the controller 100. The C1 pressure is supplied to the clutch C1 via the oil passage L1.

The linear solenoid valve SL2 generates hydraulic pressure for engaging the brake B1 (hereinafter, referred to as B1 pressure) by regulating the line pressure PL in response to the hydraulic pressure command value PbB1 from the controller 100. The B1 pressure is supplied to the brake B1 via the oil passage L2.

The linear solenoid valve SL3 generates hydraulic pressure for engaging the clutch CS (hereinafter, referred to as CS pressure) by regulating the line pressure PL in response to the hydraulic pressure command value PbCS from the controller 100. The CS pressure is supplied to the clutch CS via the oil passage L3.

The simultaneous supply prevention valve 530 is provided in the oil passage L1, and is configured to prevent the clutch C1 and at least one of the brake B1 and the clutch CS from being simultaneously engaged. Specifically, the oil passages L2, L3 are connected to the simultaneous supply prevention valve 530. The simultaneous supply prevention valve 530 operates by using the B1 pressure and the CS pressure through the oil passages L2, L3 as signal pressures.

When both signal pressures that are the B1 pressure and the CS pressure are not input to the simultaneous supply prevention valve 530 (that is, when both the brake B1 and the clutch CS are released), the simultaneous supply prevention valve 530 is in a normal state in which the C1 pressure is supplied to the clutch C1. FIG. 4 illustrates the case where the simultaneous supply prevention valve 530 is in the normal state.

On the other hand, when at least one of the signal pressures that are the B1 pressure and the CS pressure is input to the simultaneous supply prevention valve 530 (that is, when at least one of the brake B1 and the clutch CS is engaged), even when the clutch C1 is engaged, the simultaneous supply prevention valve 530 switches into a drain state in which supply of the C1 pressure to the clutch C1 is cut off and the hydraulic pressure in the clutch C1 is released to the outside. Thus, the clutch C1 is released, so the clutch C1 and at least one of the brake B1 and the clutch CS are prevented from being simultaneously engaged.

Similarly, the simultaneous supply prevention valve 540 operates in response to the C1 pressure and the CS pressure as signal pressures to prevent the brake B1 and at least one of the clutch C1 and the clutch CS from being simultaneously engaged. Specifically, when both the signal pressures that are the C1 pressure and the CS pressure are not input to the simultaneous supply prevention valve 540, the simultaneous supply prevention valve 540 is in a normal state in which the B1 pressure is supplied to the brake B1. On the other hand, when at least one of the signal pressures that are the C1 pressure and the CS pressure is input to the simultaneous supply prevention valve 540, the simultaneous supply prevention valve 540 switches into a drain state in which supply of the B1 pressure to the brake B1 is cut off and the hydraulic pressure in the brake B1 is released to the outside. FIG. 4 illustrates the case where the C1 pressure is input to the simultaneous supply prevention valve 540 as the signal pressure and the simultaneous supply prevention valve 540 is in the drain state.

Similarly, the simultaneous supply prevention valve (hydraulic valve) 550 operates by using the C1 pressure and the B1 pressure as signal pressures to prevent the clutch CS and at least one of the clutch C1 and the brake B1 from being simultaneously engaged. Specifically, when both the signal pressures that are the C1 pressure and the B1 pressure are not input to the simultaneous supply prevention valve 550, the simultaneous supply prevention valve 550 is in a normal state in which the CS pressure is supplied to the clutch CS. On the other hand, when at least one of the signal pressures that are the C1 pressure and the B1 pressure is input to the simultaneous supply prevention valve 550, the simultaneous supply prevention valve 550 switches into a drain state in which supply of the CS pressure to the clutch CS is cut off and the hydraulic pressure in the clutch CS is released to the outside. FIG. 4 illustrates the case where the C1 pressure is input to the simultaneous supply prevention valve 550 and the simultaneous supply prevention valve 550 is in the drain state.

The EOP 502 is driven by a motor 502A to generate hydraulic pressure. The motor 502A is controlled by the control signal NM from the controller 100. Therefore, the EOP 502 is operable irrespective of whether the carrier CA2 is rotating. The EOP 502 outputs generated hydraulic pressure to the oil passage LE.

The hydraulic pressure in the oil passage LE is regulated (reduced) to a predetermined pressure by the pressure regulating valve 520. The oil passage LE is connected to the oil passage LM via the check valve 570. When the hydraulic pressure in the oil passage LE is higher by a predetermined pressure or more than the hydraulic pressure in the oil passage LM, the check valve 570 opens, and the hydraulic pressure in the oil passage LE is supplied to the oil passage LM via the check valve 570. Thus, during a stop of the MOP 501 as well, it is possible to supply hydraulic pressure to the oil passage LM by driving the EOP 502.

The electromagnetic change-over valve 560 is switched to any one of an on state and an off state in response to the control signal S/C from the controller 100. In the on state, the electromagnetic change-over valve 560 communicates the oil passage LE with the oil passage L4. In the off state, the electromagnetic change-over valve 560 interrupts the oil passage LE from the oil passage L4, and releases the hydraulic pressure in the oil passage L4 to the outside. FIG. 4 illustrates the case where the electromagnetic change-over valve 560 is in the off state.

The oil passage L4 is connected to the simultaneous supply prevention valves 530, 540. When the electromagnetic change-over valve 560 is in the on state, the hydraulic pressure in the oil passage LE is input to the simultaneous supply prevention valves 530, 540 via the oil passage L4 as a signal pressure. When the signal pressure from the oil passage L4 is input to the simultaneous supply prevention valve 530, the simultaneous supply prevention valve 530 is forcibly fixed to the normal state irrespective of whether the signal pressure (B1 pressure) is input from the oil passage L2. Similarly, when the signal pressure is input from the oil passage L4 to the simultaneous supply prevention valve 540, the simultaneous supply prevention valve 540 is forcibly fixed to the normal state irrespective of whether the signal pressure (C1 pressure) is input from the oil passage L1. Therefore, by driving the EOP 502 and switching the electromagnetic change-over valve 560 to the on state, the simultaneous supply prevention valves 530, 540 are simultaneously fixed to the normal state. Thus, the clutch C1 and the brake B1 are allowed to be simultaneously engaged, and two-motor mode (described later) is enabled.

Next, control modes of the hybrid vehicle 1 will be described. Hereinafter, the details of the control modes of the hybrid vehicle 1 will be described with reference to an operation engagement chart and the nomographs.

FIG. 5 is a chart that shows each drive mode and controlled statuses of the clutch C1 and brake B1 of the transmission unit (power transmission unit) 40 in each drive mode.

The controller 100 causes the hybrid vehicle 1 to travel in motor drive mode (hereinafter, referred to as EV mode) or hybrid mode (hereinafter, referred to as HV mode). The EV mode is a control mode in which the engine 10 is stopped and the hybrid vehicle 1 is caused to travel by using the power of at least one of the first MG 20 and the second MG 30. The HV mode is a control mode in which the hybrid vehicle 1 is caused to travel by using the power of the engine 10 and the power of the second MG 30. Each of the EV mode and the HV mode is further divided into some control modes.

In FIG. 5, C1, B1, CS, MG1 and MG2, respectively denote the clutch C1, the brake B1, the clutch CS, the first MG 20 and the second MG 30. The circle mark (○) in each of the C1, B1, CS columns indicates the engaged state, the cross mark (×) indicates the released state, and the triangle mark (Δ) indicates that any one of the clutch C1 and the brake B1 is engaged during engine brake. The sign G in each of the MG1 column and the MG2 column indicates that the MG1 or the MG2 is mainly operated as a generator. The sign M in each of the MG1 column and the MG2 column indicates that the MG1 or the MG2 is mainly operated as a motor.

In EV mode, the controller 100 selectively switches between one-motor mode and two-motor mode in response to a user's required torque, and the like. In one-motor mode, the hybrid vehicle 1 is caused to travel by using the power of the second MG 30 alone. In two-motor mode, the hybrid vehicle 1 is caused to travel by using the power of both the first MG 20 and the second MG 30. For example, when the load of the drive system 2 is low, the one-motor mode is used, and, when the load of the drive system 2 becomes high, the drive mode is changed to the two-motor mode.

As shown in E1 line of FIG. 5, when the hybrid vehicle 1 is driven (moved forward or reversed) in one-motor EV mode, the controller 100 places the transmission unit 40 in the neutral state (state in which no power is transmitted) by releasing the clutch C1 and releasing the brake B1. At this time, the controller 100 mainly uses the first MG 20 to fix the rotation speed of the sun gear S2 to zero, and causes the second MG 30 to operate as a motor (see FIG. 6 (described later)). As a technique for fixing the rotation speed of the sun gear S2 to zero with the use of the first MG 20, the current of the first MG 20 may be controlled in a feedback manner such that the rotation speed of the first MG 20 becomes zero or, if possible, cogging torque of the first MG 20 may be utilized without adding current to the first MG 20. When the transmission unit 40 is placed in the neutral state, the engine 10 is not co-rotated during braking, so a loss is smaller by that amount, and it is possible to recover large regenerated electric power.

As shown in the E2 line in FIG. 5, when the hybrid vehicle 1 is braked in one-motor EV mode and engine brake is required, the controller 100 engages any one of the clutch C1 and the brake B1. For example, when braking force is insufficient with only regenerative brake, engine brake is used together with regenerative brake. For example, when the SOC of the battery is close to a full charge state, regenerated electric power cannot be charged, so it is conceivable to establish an engine brake state.

By engaging any one of the clutch C1 and the brake B1, a so-called engine brake state is established. In the engine brake state, the rotation of the drive wheels 90 is transmitted to the engine 10, and the engine 10 is rotated. At this time, the controller 100 causes the first MG 20 to mainly operate as a motor, and causes the second MG 30 to mainly operate as a generator.

On the other hand, as shown in the E3 line in FIG. 5, when the hybrid vehicle 1 is driven (moved forward or reversed) in two-motor EV mode, the controller 100 restricts (locks) the rotation of the ring gear R1 of the transmission unit 40 by engaging the clutch C1 and engaging the brake B1. Thus, the rotation of the carrier CA2 of the differential unit 50 coupled to the ring gear R1 of the transmission unit 40 is also restricted (locked), so the carrier CA2 of the differential unit 50 is kept in a stopped state (Engine Rotation Speed Ne=0). The controller 100 causes the first MG 20 and the second MG 30 to mainly operate as motors (see FIG. 7 (described later)).

In EV mode (one-motor mode or two-motor mode), the engine 10 is stopped, so the MOP 501 is also stopped. Therefore, in EV mode, the clutch C1 or the brake B1 is engaged by using hydraulic pressure that is generated by the EOP 502.

In HV mode, the controller 100 causes the first MG 20 to operate as a generator, and causes the second MG 30 to operate as a motor. In HV mode, the controller 100 sets the control mode to any one of the series-parallel mode and the series mode.

In series-parallel mode, part of the power of the engine 10 is used in order to drive the drive wheels 90, and the remaining part of the power of the engine 10 is used as power for generating electric power in the first MG 20. The second MG 30 drives the drive wheels 90 by using electric power generated by the first MG 20. In series-parallel mode, the controller 100 changes the speed ratio of the transmission unit 40 in response to the vehicle speed.

When the hybrid vehicle 1 is caused to move forward in an intermediate or low speed range, the controller 100 establishes the low gear position Lo (see the continuous line in FIG. 8 (described later)) by engaging the clutch C1 and releasing the brake B1 as shown in the H2 line in FIG. 5. On the other hand, when the hybrid vehicle 1 is caused to move forward in a high speed range, the controller 100 establishes the high gear position Hi (see the dashed line in FIG. 8 (described later)) by releasing the clutch C1 and engaging the brake B1 as shown in the H1 line in FIG. 5. Either when the high gear position is established or when the low gear position is established, the transmission unit 40 and the differential unit 50 operate as a continuously variable transmission as a whole.

When the hybrid vehicle 1 is reversed, the controller 100 engages the clutch C1 and releases the brake B1 as shown in the H3 line in FIG. 5. When there is an allowance in the SOC of the battery, the controller 100 rotates the second MG 30 alone in the reverse direction; whereas, when there is no allowance in the SOC of the battery, the controller 100 generates electric power with the use of the first MG 20 by operating the engine 10 and rotates the second MG 30 in the reverse direction.

In series mode, the entire power of the engine 10 is used as power for generating electric power with the use of the first MG 20. The second MG 30 drives the drive wheels 90 by using electric power generated by the first MG 20. In series mode, when the hybrid vehicle 1 is moved forward or when the hybrid vehicle 1 is reversed, the controller 100 releases both the clutch C1 and the brake B1 and engages the clutch CS (see FIG. 9 (described later)) as shown in the H4 line and the H5 line in FIG. 5.

In HV mode, the engine 10 is operating, so the MOP 501 is also operating. Therefore, in HV mode, the clutch C1, the clutch CS or the brake B1 is engaged mainly by using hydraulic pressure generated by the MOP 501.

Hereinafter, the statuses of the rotating elements in each operation mode shown in FIG. 5 will be described with reference to the nomographs.

Figure 6:
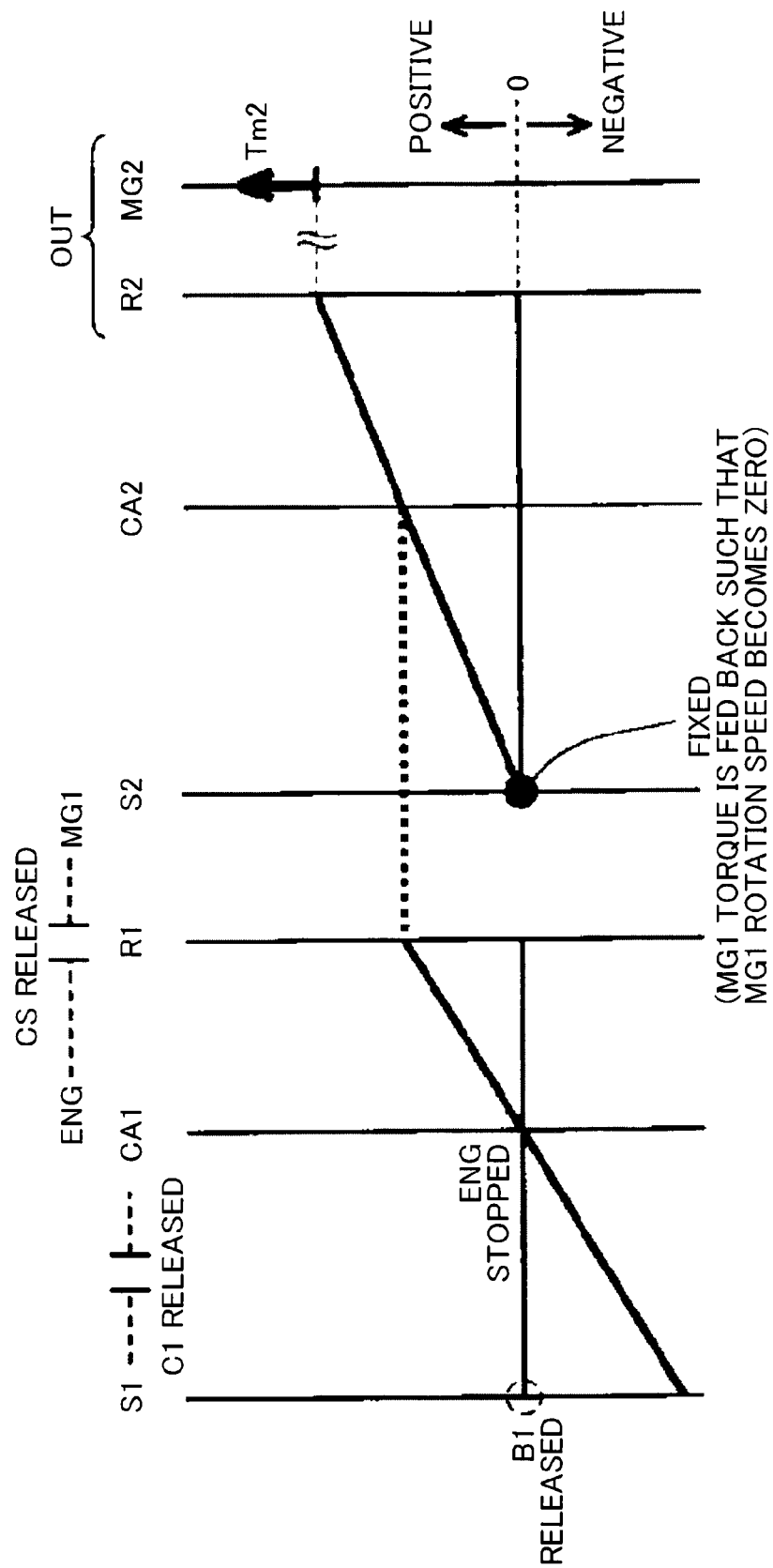
FIG. 6 is a nomograph in one-motor EV mode that is one of the drive modes shown in FIG. 5.
Figure 7:
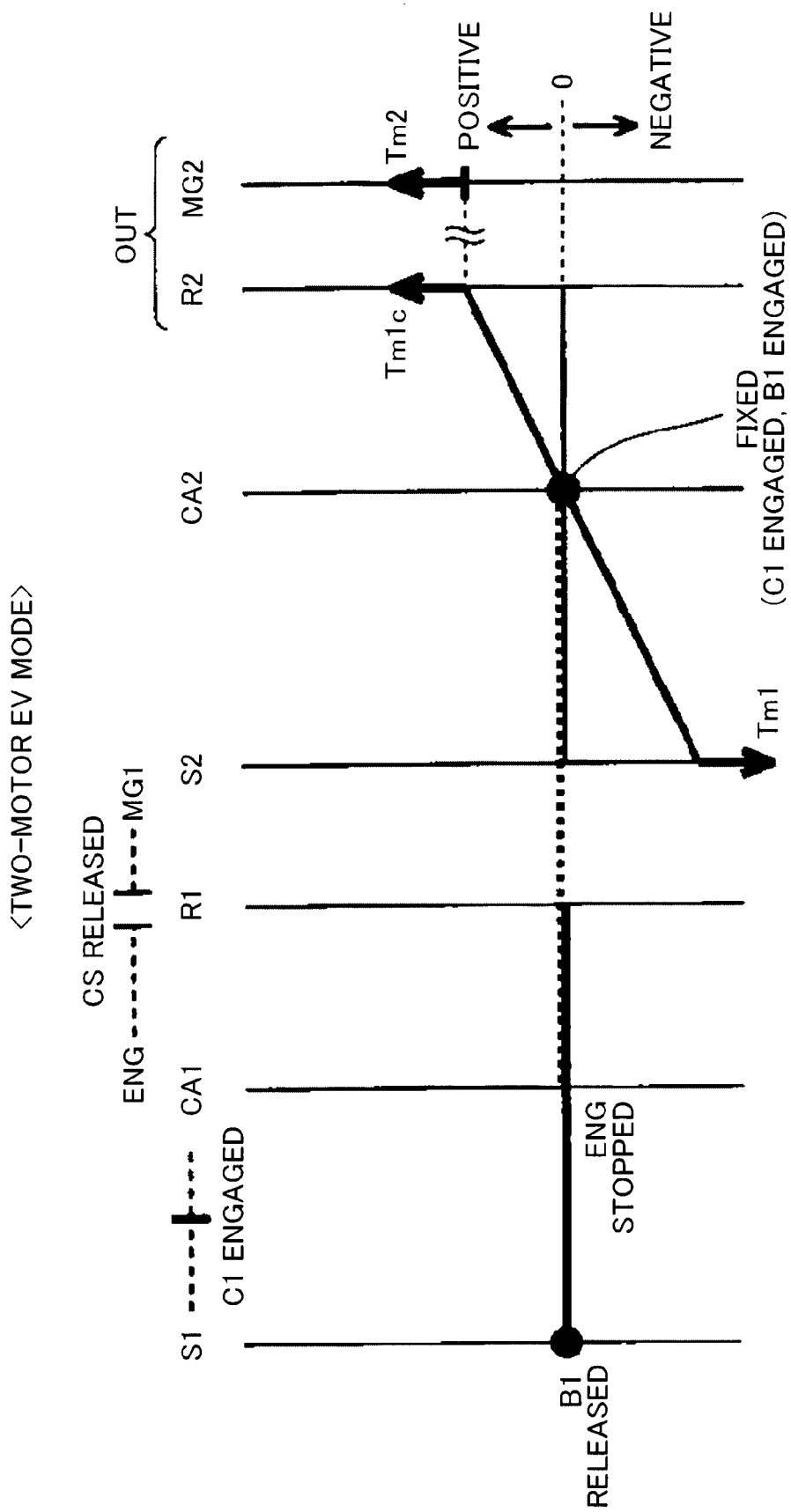
FIG. 7 is a nomograph in two-motor EV mode that is one of the drive modes shown in FIG. 5.

FIG. 6 is a nomograph in one-motor EV mode. FIG. 7 is a nomograph in two-motor EV mode. FIG. 8 is a nomograph in series-parallel mode. FIG. 9 is a nomograph in series mode.

In FIG. 6 to FIG. 9, S1, CA1 and R1 respectively denote the sun gear S1, the carrier CA1 and the ring gear R1 of the transmission unit 40, S2, CA2 and R2 respectively denote the sun gear S2, the carrier CA2 and the ring gear R2 of the differential unit 50.

The controlled status in one-motor EV mode (E1 line in FIG. 5) will be described with reference to FIG. 6. In one-motor EV mode, the controller 100 releases the clutch C1, the brake B1 and the clutch CS of the transmission unit 40, stops the engine 10, and causes the second MG 30 to mainly operate as a motor. Therefore, in one-motor EV mode, the hybrid vehicle 1 travels by using the torque of the second MG 30 (hereinafter, referred to as second MG torque Tm2).

At this time, the controller 100 executes feedback control over the torque of the first MG 20 (hereinafter, referred to as first MG torque Tm1) such that the rotation speed of the sun gear S2 becomes zero. Therefore, the sun gear S2 does not rotate. However, because the clutch C1 and brake B1 of the transmission unit 40 are released, the rotation of the carrier CA2 of the differential unit 50 is not restricted. Therefore, the ring gear R2 and carrier CA2 of the differential unit 50 and the ring gear R1 of the transmission unit 40 are rotated (coasted) interlocking with the rotation of the second MG 30 in the same direction as the second MG 30.

On the other hand, the carrier CA1 of the transmission unit 40 is kept in a stopped state because the engine 10 is stopped. The sun gear S1 of the transmission unit 40 is rotated (coasted) interlocking with the rotation of the ring gear R1 in a direction opposite to the rotation direction of the ring gear R1.

In order to decelerate the vehicle in one-motor EV mode, it is allowed to activate engine brake in addition to regenerative brake using the second MG 30. In this case (E2 line in FIG. 5), by engaging any one of the clutch C1 and the brake B1, the engine 10 is also rotated at the time when the carrier CA2 is driven from the drive wheels 90 side, so engine brake is activated.

Next, the controlled status in two-motor EV mode (E3 line in FIG. 5) will be described with reference to FIG. 7. In two-motor EV mode, the controller 100 engages the clutch C1 and the brake B1, releases the clutch CS, and stops the engine 10. Therefore, the rotation of each of the sun gear S1, carrier CA1 and ring gear R1 of the transmission unit 40 is restricted such that the rotation speed becomes zero.

Because the rotation of the ring gear R1 of the transmission unit 40 is restricted, the rotation of the carrier CA2 of the differential unit 50 is also restricted (locked). In this state, the controller 100 causes the first MG 20 and the second MG 30 to mainly operate as motors. Specifically, the second MG 30 is rotated in the positive direction by setting the second MG torque Tm2 to a positive torque, and the first MG 20 is rotated in the negative direction by setting the first MG torque Tm1 to a negative torque.

When the rotation of the carrier CA2 is restricted by engaging the clutch C1, the first MG torque Tm1 is transmitted to the ring gear R2 by using the carrier CA2 as a supporting point. The first MG torque Tm1 (hereinafter, referred to as first MG transmission torque Tm1$c$) that is transmitted to the ring gear R2 acts in the positive direction, and is transmitted to the counter shaft 70. Therefore, in two-motor EV mode, the hybrid vehicle 1 travels by using the first MG transmission torque Tm1$c$ and the second MG torque Tm2. The controller 100 adjusts the distribution ratio between the first MG torque Tm1 and the second MG torque Tm2 such that the sum of the first MG transmission torque Tm1$c$ and the second MG torque Tm2 meets the user's required torque.

The controlled state in series-parallel HV mode (H1 to H3 lines in FIG. 5) will be described with reference to FIG. 8. FIG. 8 illustrates the case where the vehicle is traveling forward in the low gear position Lo (see H2 line in FIG. 5, and the continuous common line shown in the nomograph of S1, CA1 and R1 in FIG. 8) and the case where the vehicle is traveling forward in the high gear position Hi (see H1 line in FIG. 5, and the dashed common line shown in the nomograph of S1, CA1 and R1 in FIG. 8). For the sake of convenience of description, it is assumed that the rotation speed of the ring gear R1 is the same either when the vehicle is traveling forward in the low gear position Lo or when the vehicle is traveling forward in the high gear position Hi.

When the low gear position Lo is established in series-parallel HV mode, the controller 100 engages the clutch C1, and releases the brake B1 and the clutch CS. Therefore, the rotating elements (the sun gear S1, the carrier CA1 and the ring gear R1) rotate integrally with one another. Thus, the ring gear R1 of the transmission unit 40 also rotates at the same rotation speed as the carrier CA1, and the rotation of the engine 10 is transmitted from the ring gear R1 to the carrier CA2 of the differential unit 50 at the same rotation speed. That is, the torque of the engine 10 (hereinafter, referred to as engine torque Te) input to the carrier CA1 of the transmission unit 40 is transmitted from the ring gear R1 of the transmission unit 40 to the carrier CA2 of the differential unit 50. When the low gear position Lo is established, the torque that is transmitted from the ring gear R1 (hereinafter, referred to as transmission unit output torque Tr1) is equal to the engine torque Te (Te=Tr1).

The rotation of the engine 10, transmitted to the carrier CA2 of the differential unit 50, is steplessly shifted by the use of the rotation speed of the sun gear S2 (the rotation speed of the first MG 20), and is transmitted to the ring gear R2 of the differential unit 50. At this time, the controller 100 basically causes the first MG 20 to operate as a generator to apply the first MG torque Tm1 in the negative direction. Thus, the first MG torque Tm1 serves as reaction force for transmitting the engine torque Te, input to the carrier CA2, to the ring gear R2.

The engine torque Te transmitted to the ring gear R2 (hereinafter, referred to as engine transmission torque Tec) is transmitted from the counter drive gear 51 to the counter shaft 70, and acts as driving force of the hybrid vehicle 1.

In series-parallel HV mode, the controller 100 causes the second MG 30 to mainly operate as a motor. The second MG torque Tm2 is transmitted from the reduction gear 32 to the counter shaft 70, and acts as driving force of the hybrid vehicle 1. That is, in series-parallel HV mode, the hybrid vehicle 1 travels by using the engine transmission torque Tec and the second MG torque Tm2.

On the other hand, when the high gear position Hi is established in series-parallel HV mode, the controller 100 engages the brake B1, and releases the clutch C1 and the clutch CS. Because the brake B1 is engaged, the rotation of the sun gear S1 is restricted. Thus, the rotation of the engine 10, input to the carrier CA1 of the transmission unit 40, is increased in speed, and is transmitted from the ring gear R1 of the transmission unit 40 to the carrier CA2 of the differential unit 50. Therefore, when the high gear position Hi is established, the transmission unit output torque Tr1 is smaller than the engine torque Te (Te>Tr1).

The controlled statuses in series HV mode (H4 line in FIG. 5) will be described with reference to FIG. 9. In series HV mode, the controller 100 releases the clutch C1 and the brake B1, and engages the clutch CS. Therefore, when the clutch CS is engaged, the sun gear S2 of the differential unit 50 rotates at the same rotation speed as the carrier CA1 of the transmission unit 40, and the rotation of the engine 10 is directly transmitted to the first MG 20 via the clutch CS. Thus, electric power is allowed to be generated with the use of the first MG 20 by using the engine 10 as a power source.

On the other hand, because both the clutch C1 and the brake B1 are released and, as a result, the transmission unit 40 is placed in the neutral state, the rotation of each of the sun gear S1 and ring gear R1 of the transmission unit 40 and the rotation of the carrier CA2 of the differential unit 50 are not restricted. Therefore, the power of the first MG 20 and the power of the engine 10 are not transmitted to the counter shaft 70. Therefore, in series HV mode, while electric power is generated with the use of the first MG 20 by using the engine 10 as a power source, the hybrid vehicle 1 travels by using the second MG torque Tm2 with the use of part or all of the generated electric power.

Next, the operation of the mechanical oil pump (MOP) will be described. As described above, in the hybrid vehicle 1 according to the present embodiment, the MOP 501 is connected to the carrier CA2 of the differential unit 50, so it is possible to operate the MOP 501 in a state where the engine 10 is stopped.

For example, when the engine 10 is stopped during traveling in series mode, the rotation of the carrier CA1 of the transmission unit 40, connected to the output shaft of the engine 10; is stopped, and the rotation of the sun gear S2 of the differential unit 50, coupled to the carrier CA1 of the transmission unit 40 via the clutch CS, is also stopped. However, when the hybrid vehicle 1 is traveling forward, the ring gear R2 of the differential unit 50 is rotated, and the carrier CA2 is also rotated with the rotation of the ring gear R2. Therefore, in series mode, when the hybrid vehicle 1 is traveling forward at a vehicle speed higher than or equal to a predetermined value, the MOP 501 is allowed to be operated even in a state where the engine 10 is stopped.

Because the MOP 501 is connected to not the sun gear S2 of the differential unit 50 but the carrier CA2 of the differential unit 50, it is possible to control the rotation speed of the engine 10 and the rotation speed of the MOP 501 independently of each other in series mode.

In one-motor EV mode, the engine 10 is stopped, and the rotation of the carrier CA1 of the transmission unit 40 is also stopped. However, by rotating the sun gear S2 with the use of the first MG 20, the carrier CA2 is allowed to be rotated irrespective of the state of the ring gear R2. That is, in one-motor EV mode, when the first MG 20 is allowed to be driven, even when the hybrid vehicle 1 stops and the engine 10 is stopped, the MOP 501 is allowed to be operated. Therefore, it is possible to improve the durability of the EOP 502 by reducing the frequency of operation of the EOP 502 in one-motor EV mode.

In two-motor EV mode, as shown in FIG. 7, the rotation of the transmission unit 40 is restricted, and the carrier CA2 of the differential unit 50 is also fixed, so it is not possible to operate the MOP 501. Therefore, the EOP 502 needs to be operated.

As described above, the hybrid vehicle 1 according to the present embodiment is able to select one of the series-parallel mode and the series mode by controlling the transmission unit 40 provided in the path K1 and the clutch CS provided in the path K2. In addition, in the hybrid vehicle 1, the MOP 501 is connected to the carrier CA2 of the differential unit 50. Therefore, it is possible to operate the MOP 501 in a state where the engine 10 is stopped. As a result, it is possible to improve the durability of the EOP 502 by reducing the frequency of operation of the EOP 502.

The carrier CA2 of the differential unit 50, to which the MOP 501 is connected, does not rotate in the negative direction in any drive mode, so a device for preventing reverse rotation of the MOP 501 is not required, so the configuration around the MOP 501 is simplified. That is, when the MOP 501 is connected to the ring gear R2 of the differential unit 50, the ring gear R2 rotates in the negative direction at the time when the vehicle moves backward, so a reverse rotation prevention device (one-way clutch, or the like) for preventing reverse rotation of the MOP 501 needs to be provided around the MOP 501. When the MOP 501 is connected to the sun gear S2 of the differential unit 50 as well, the sun gear S2 can rotate in the negative direction, so a reverse rotation prevention device needs to be provided around the MOP 501. However, the carrier CA2 of the differential unit 50, to which the MOP 501 is connected, does not rotate in the negative direction in any mode, and the above-described reverse rotation prevention device is not required, so it is possible to simplify (compactify) the configuration around the MOP 501.

Figure 10:
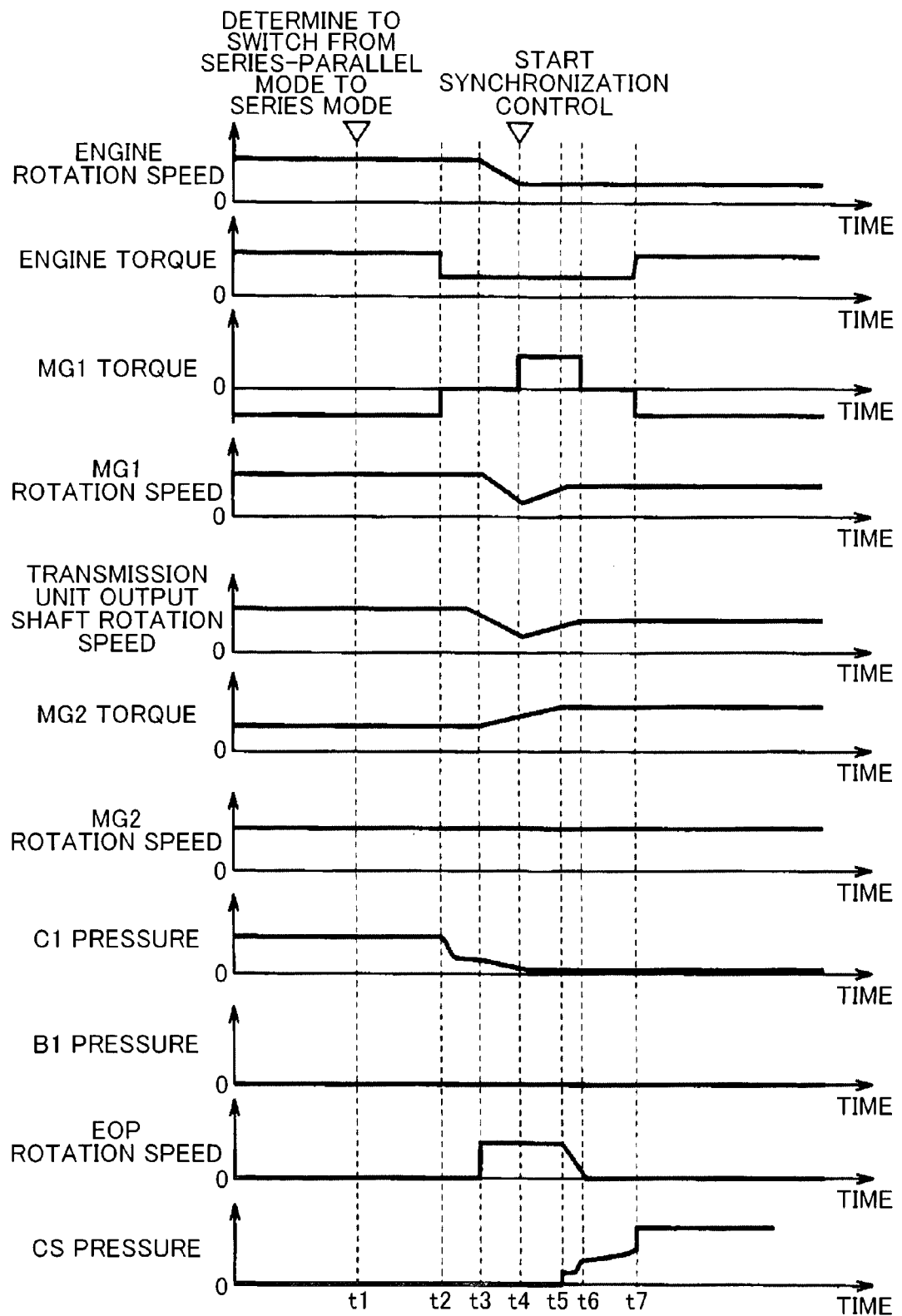
FIG. 10 is a time chart that shows changes in the states of the hybrid vehicle at the time of switching from series-parallel mode to series mode among the drive modes shown in FIG. 5.

Next, control for switching from series-parallel mode to series mode will be described. FIG. 10 is a time chart that shows changes in the states of the hybrid vehicle 1 at the time of switching from series-parallel mode to series mode. As shown in FIG. 10, control for switching from series-parallel mode to series mode, which is executed by the controller 100, will be described.

Control for switching from series-parallel mode to series mode is implemented by causing the transmission unit 40 to switch from the power transmission state to the neutral state (that is, by causing the clutch C1 or the brake B1 to switch from the engaged state to the released state) and causing the clutch CS to switch from the released state to the engaged state. FIG. 10 illustrates the case where, before time t1, the series-parallel mode is set in a low gear position Lo by engaging the clutch C1.

When it is determined at time t1 to switch into series mode, the controller 100 reduces the reaction torque (negative torque) of the first MG 20 to zero after time t2, and begins to reduce C1 pressure in order to start releasing the clutch C1. Thus, at time t3, the rotation speed of the engine 10 and the rotation speed of the first MG 20 begin to decrease.

At time t4, the controller 100 starts synchronization control for synchronizing the rotation speed of the first MG 20 with the rotation speed of the engine 10. Specifically, the controller 100 increases the rotation speed of the first MG 20 to a synchronization rotation speed at the time of engagement of the clutch CS by changing the first MG torque Tm1 from zero to positive torque.

At time t5, the controller 100 begins to increase the CS pressure in order to start engagement of the clutch CS. After that, at time t7, when the CS pressure reaches a predetermined engagement pressure and engagement of the clutch CS completes, the controller 100 causes the first MG 20 to generate electric power by setting the first MG torque Tm1 to negative torque again, thus starting the series mode.

Figure 8:
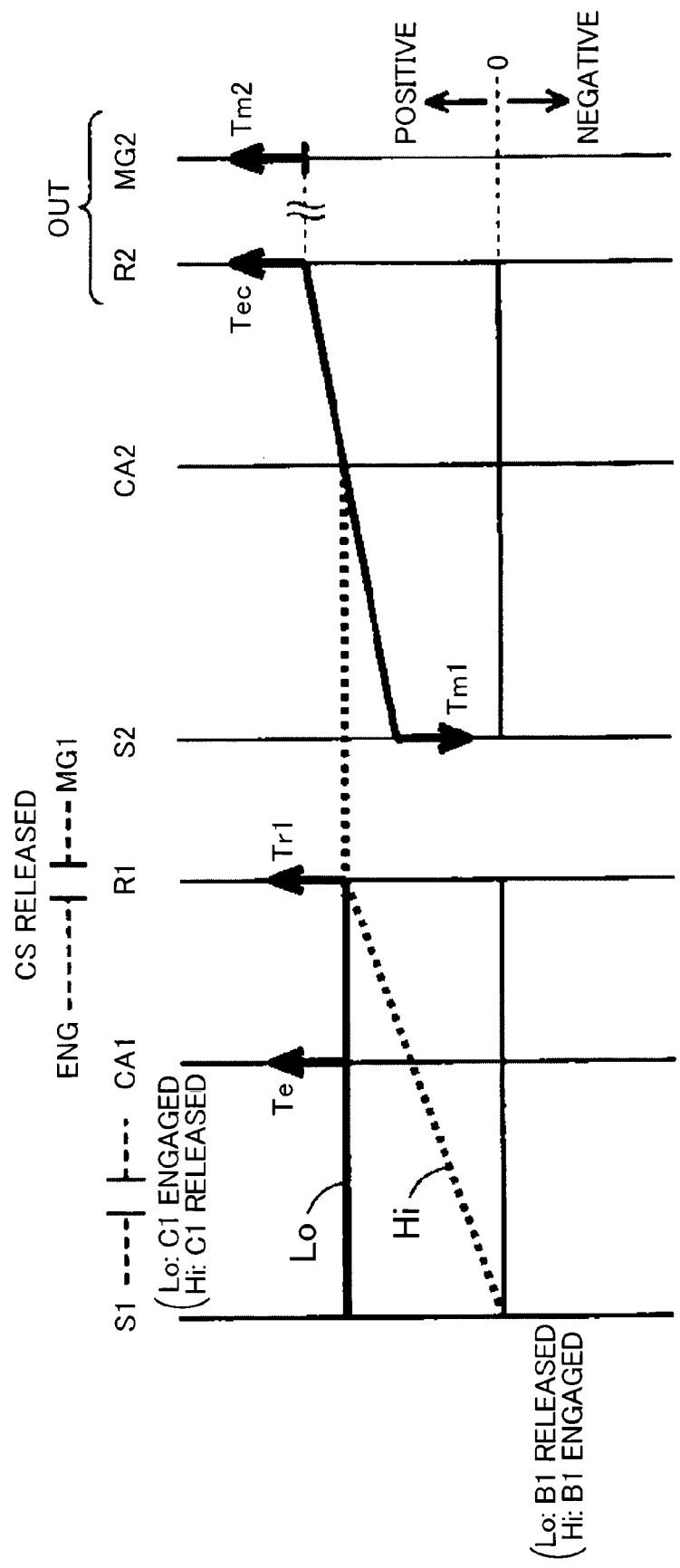
FIG. 8 is a first nomograph in series-parallel HV mode that is one of the drive modes shown in FIG. 5.
Figure 9:
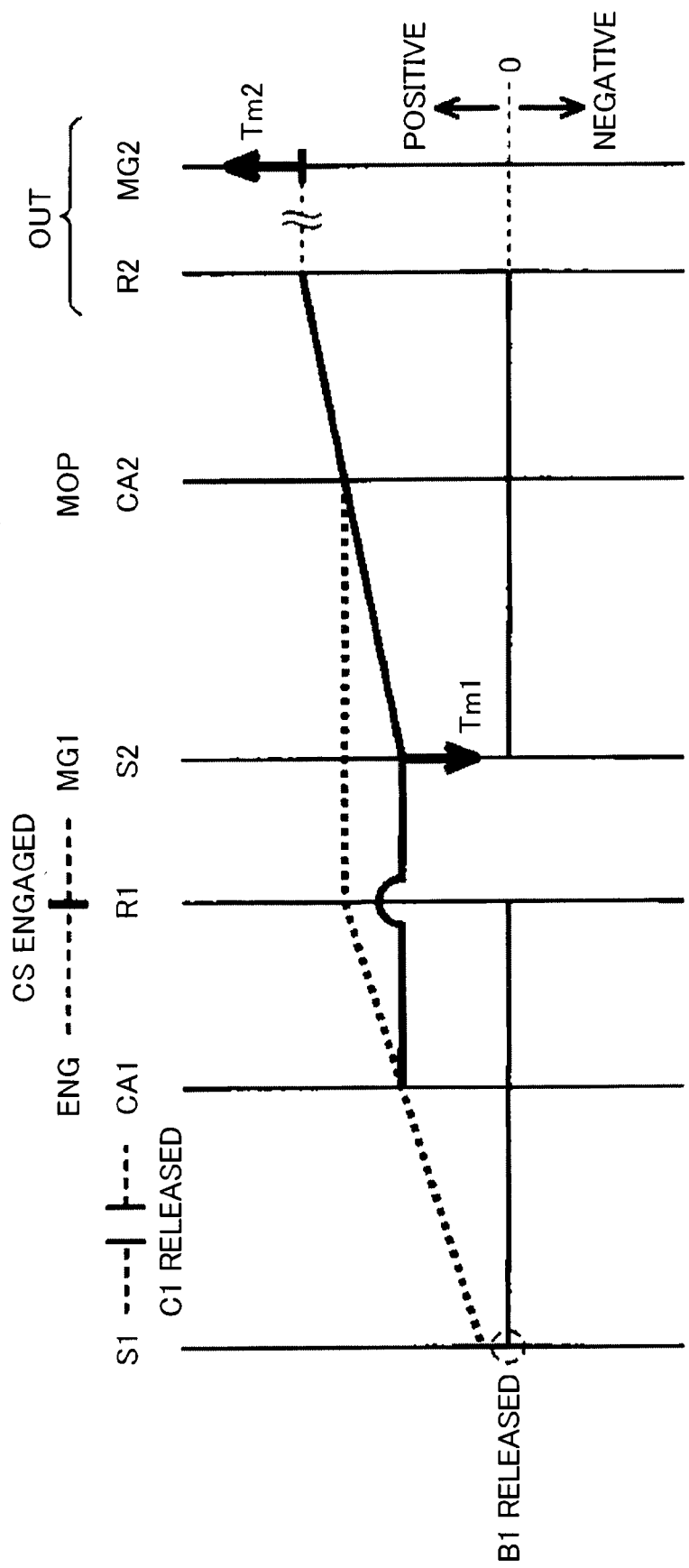
FIG. 9 is a nomograph in series HV mode that is one of the drive modes shown in FIG. 5.

An engine transmission torque Tec transmitted to the ring gear R2 in series-parallel mode is not, transmitted to the ring gear R2 after switching into series mode (see FIG. 8 and FIG. 9). In consideration of this point, the controller 100 increases a second MG torque Tm2 after time t3. Thus, a decrease in driving force is suppressed by switching from series-parallel mode to series mode.

In the example shown in FIG. 10, in consideration of the fact that the rotation speed of the MOP 501 temporarily decreases as a result of switching from series-parallel mode to series mode, the controller 100 operates the EOP 502 to increase the rotation speed of the EOP 502 from time t3 to time t6.

Figure 11:
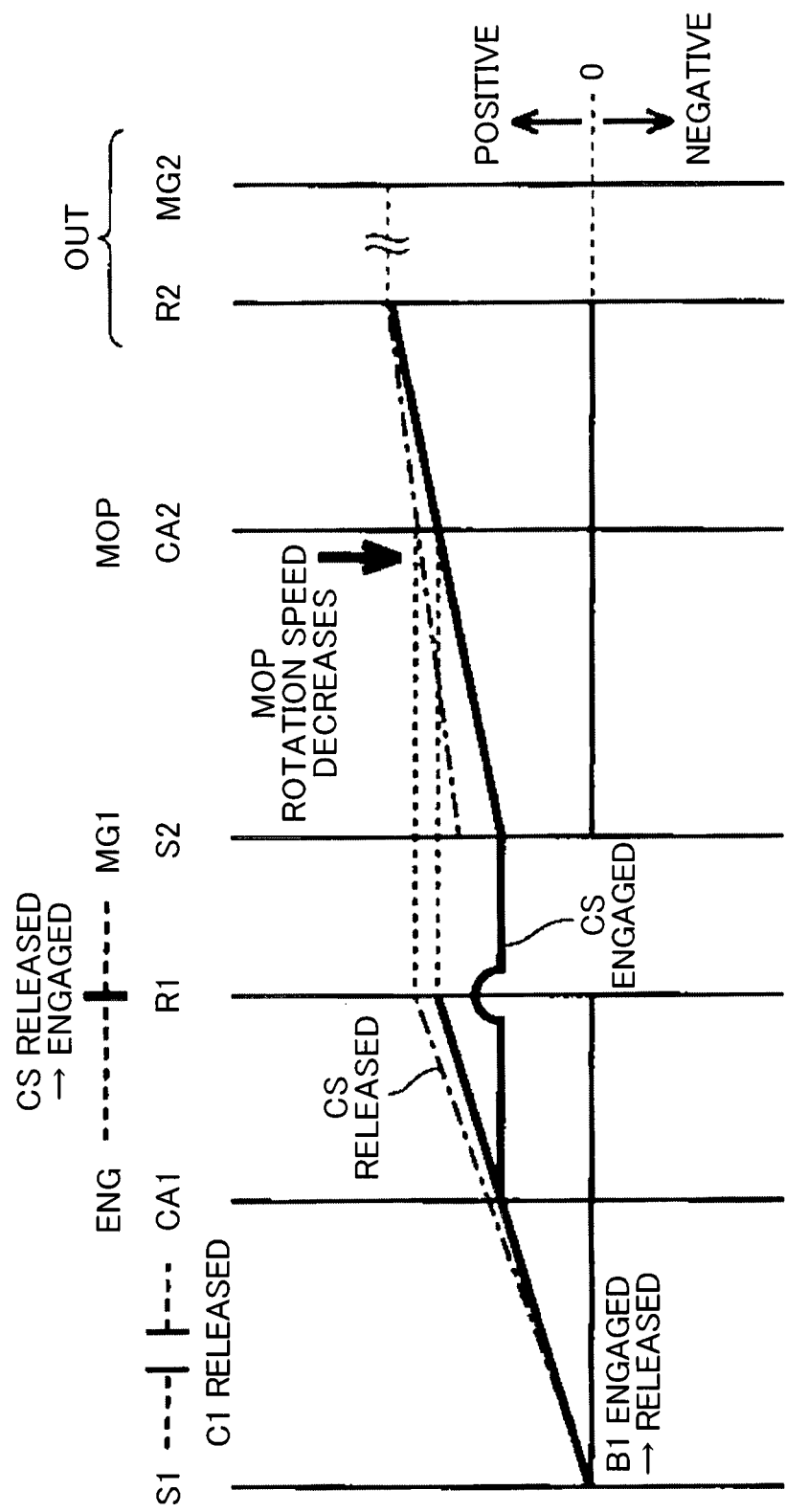
FIG. 11 is a first nomograph that shows an example of changes in the statuses of rotating elements at the time of switching from series parallel mode to series mode among the drive modes shown in FIG. 5.

FIG. 11 is a nomograph that shows an example of changes in the statuses of the rotating elements when the drive mode is switched from series-parallel mode to series mode in a state where the rotation speed of the first MG 20 is higher than the rotation speed of the engine 10. In FIG. 11, the alternate long and short dashes line represents a common line in the case where the brake B1 has been engaged just before switching into series mode (just before the clutch CS is engaged). The solid line represents a common line just after switching into series mode (just after the clutch CS is engaged).

As shown in FIG. 11, when the rotation speed of the first MG 20 is higher than the rotation speed of the engine 10 just before switching into series mode, the rotation speed of the first MG 20 decreases toward the rotation speed of the engine 10 as a result of engagement of the clutch CS. At this time, because the rotation speed of the ring gear R2 of the differential unit 50 almost does not change because of the inertia force of the hybrid vehicle 1, the rotation speed of the carrier CA2 of the differential unit 50 decreases with a decrease in the rotation speed of the first MG 20 as shown in FIG. 11, so hydraulic pressure that is generated by the MOP 501 also decreases.

In consideration of such a phenomenon, when the rotation speed of the first MG 20 is higher than the rotation speed of the engine 10, the controller 100 predicts a decrease in hydraulic pressure due to a temporal decrease in rotation of the MOP 501 resulting from switching from series-parallel mode to series mode, and increases the rotation speed of the EOP 502 in advance. Thus, the amount of decrease in hydraulic pressure of the MOP 501 is compensated by the amount of increase in hydraulic pressure of the EOP 502.

On the other hand, when the drive mode is switched from series-parallel mode to series mode in a state where the rotation speed of the engine 10 is higher than the rotation speed of the first MG 20, the rotation speed of the MOP 501 temporarily increases, so the controller 100 decreases the rotation speed of the EOP 502.

Figure 12:
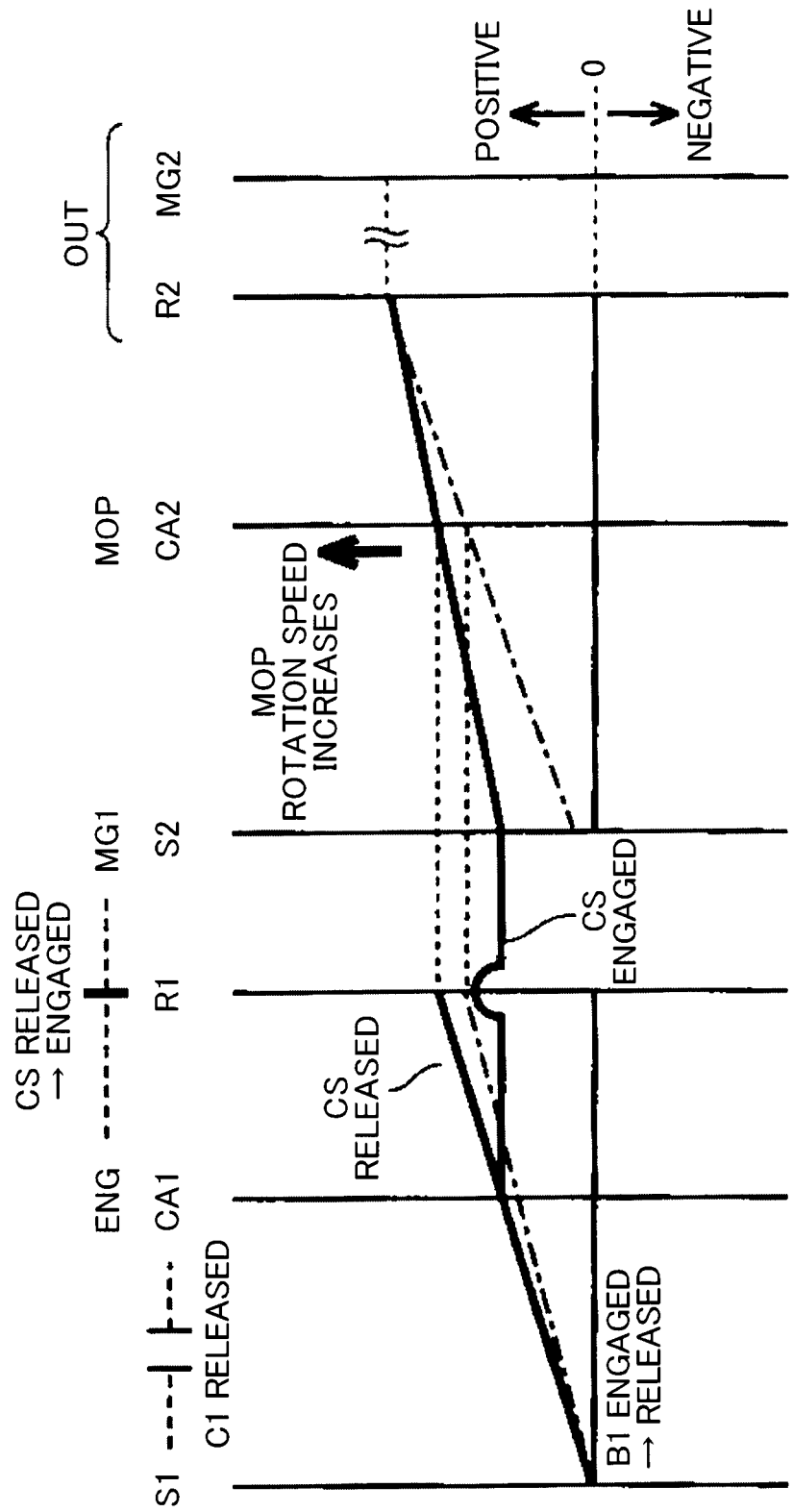
FIG. 12 is a second nomograph that shows an example of changes in the statuses of the rotating elements at the time of switching from series-parallel mode to series mode among the drive modes shown in FIG. 5.

FIG. 12 is a nomograph that shows an example of changes in the statuses of the rotating elements when the drive mode is switched from series-parallel mode to series mode in a state where the rotation speed of the engine 10 is higher than the rotation speed of the first MG 20. In FIG. 12, the alternate long and short dashes line represents a common line in the case where the brake B1 has been engaged just before switching into series mode (just before the clutch CS is engaged). The solid line represents a common line just after switching into series mode (just after the clutch CS is engaged).

As shown in FIG. 12, when the rotation speed of the engine 10 is higher than the rotation speed of the first MG 20 just before switching into series mode, the rotation speed of the first MG 20 increases toward the rotation speed of the engine 10 as a result of engagement of the clutch CS. At this time, as shown in FIG. 12, the rotation speed of the carrier CA2 of the differential unit 50 increases with an increase in the rotation speed of the first MG 20, so hydraulic pressure that is generated by the MOP 501 also increases.

In consideration of such a phenomenon, when the rotation speed of the engine 10 is higher than the rotation speed of the first MG 20, the controller 100 predicts an increase in hydraulic pressure due to a temporal increase in rotation of the MOP 501 resulting from switching from series-parallel mode to series mode, and decreases the rotation speed of the EOP 502 in advance. Thus, the amount of increase in hydraulic pressure of the MOP 501 is cancelled by the amount of decrease in hydraulic pressure of the EOP 502.

As described above, at the time of switching from series-parallel mode to series mode, the controller 100 changes the rotation speed of the EOP 502 based on whether the rotation speed of the engine 10 is lower than the rotation speed of the first MG 20. Therefore, an increase or decrease in hydraulic pressure due to a temporal change in rotation of the MOP 501 at the time of switching from series-parallel mode to series mode is compensated by hydraulic pressure of the EOP 502. Therefore, it is possible to supply necessary and sufficient hydraulic pressure even in a period of transition of switching from series-parallel mode to series mode.

Next, an alternative embodiment to the present embodiment will be described. In the above-described embodiment, the case where the MOP 501 is connected to the carrier CA2 of the differential unit 50 is illustrated. Instead, the MOP 501 may be connected to the sun gear S2 or ring gear R2 of the differential unit 50. That is, the sun gear S2 or ring gear R2 of the differential unit 50, as well as the carrier CA2, is rotatable even in a state where the carrier CA1 of the transmission unit 40 is stopped as a result of a stop of the engine 10. Therefore, when the MOP 501 is connected to the sun gear S2 or ring gear R2 of the differential unit 50 as well, it is possible to operate the MOP 501 in a state where the engine 10 is stopped.

Figure 13:
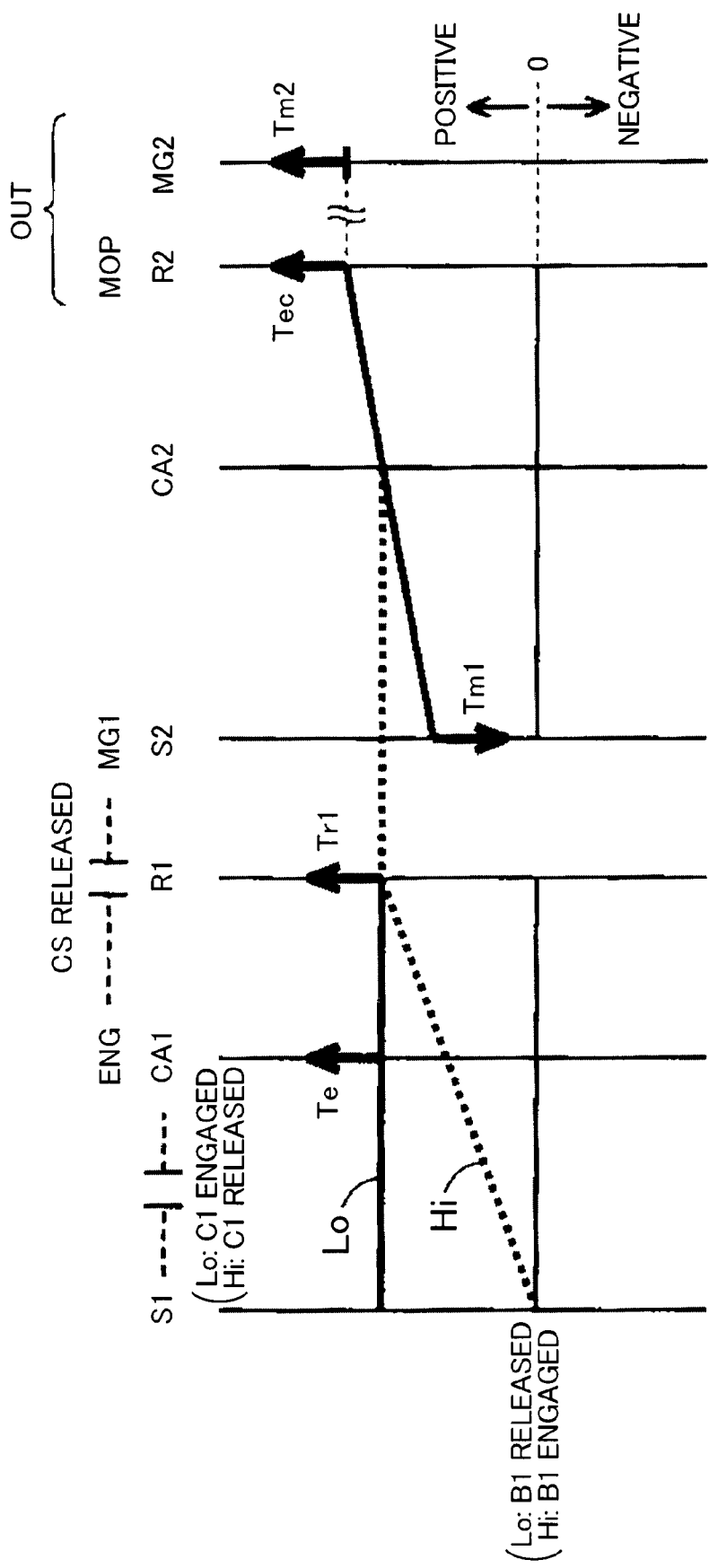
FIG. 13 is a second nomograph in series-parallel HV mode that is one of the drive modes shown in FIG. 5.

FIG. 13 is a view that shows a nomograph in series-parallel mode in the case where the MOP 501 is connected to the ring gear R2 of the differential unit 50. When the MOP 501 is connected to the ring gear R2 of the differential unit 50, and when the hybrid vehicle 1 is traveling forward as shown in FIG. 13, the ring gear R2 of the differential unit 50 rotates in the positive direction irrespective of the operating state of the engine 10. Therefore, it is possible to operate the MOP 501 even in a state where the engine 10 is stopped.

When the MOP 501 is connected to the ring gear R2 of the differential unit 50, the ring gear R2 rotates in the negative direction at the time when the vehicle moves backward, so the above-described reverse rotation prevention device just needs to be provided around the MOP 501. When the MOP 501 is connected to the sun gear S2 of the differential unit 50 as well, the sun gear S2 can rotate in the negative direction, so the above-described reverse rotation prevention device just needs to be provided around the MOP 501.

The sun gear S2 and ring gear R2 of the differential unit 50 are rotated when the vehicle is moving forward or backward in two-motor EV mode (see FIG. 7). Therefore, when the MOP 501 is connected to the sun gear S2 or ring gear R2 of the differential unit 50, it is possible to operate the MOP 501 even in two-motor EV mode.

The embodiment described above is illustrative and not restrictive in all respects. The scope of the invention is defined by the appended claims rather than the above description. The scope of the invention is intended to encompass all modifications within the scope of the appended claims and equivalents thereof.

What is claimed is:

1. A hybrid vehicle comprising:
    an internal combustion engine;
    a first rotary electric machine;
    a second rotary electric machine configured to output power to a drive wheel;
    a power transmission unit including an input element, an output element and an engaging portion, the input element being configured to receive power from the internal combustion engine, the output element being configured to output power input to the input element, and the engaging portion being configured to switch between a non-neutral state where power is transmitted between the input element and the output element and a neutral state where power is not transmitted between the input element and the output element;
    a differential unit including a first rotating element, a second rotating element and a third rotating element, the first rotating element being connected to the first rotary electric machine, the second rotating element being connected to the second rotary electric machine and the drive wheel, the third rotating element being connected to the output element, and the differential unit being configured such that, when rotation speeds of any two of the first rotating element, the second rotating element and the third rotating element are determined, a rotation speed of the remaining one of the first rotating element, the second rotating element and the third rotating element is determined;
    a clutch configured to switch between an engaged state where power is transmitted from the internal combustion engine to the first rotary electric machine and a released state where transmission of power from the internal combustion engine to the first rotary electric machine is interrupted, power from the internal combustion engine being transmitted to the first rotary electric machine through at least one of a first path or a second path, the first path being a path through which power is transmitted from the internal combustion engine to the first rotary electric machine via the power transmission unit and the differential unit, the second path being a path through which power is transmitted from the internal combustion engine to the first rotary electric machine, being different from the first path, not including the differential unit, and the clutch being provided in the second path; and a mechanical oil pump configured to generate hydraulic pressure for activating the power transmission unit and the clutch, the mechanical oil pump being configured to be driven by power that is transmitted from any one of the first rotating element, second rotating element and third rotating element of the differential unit.

2. The hybrid vehicle according to claim 1, wherein the differential unit is a planetary gear including a sun gear, a ring gear, pinions that are in mesh with the sun gear and the ring gear, and a carrier that supports the pinions such that the pinions are rotatable, the first rotating element, the second rotating element and the third rotating element are respectively the sun gear, ring gear and carrier of the planetary gear, the mechanical oil pump is connected to the carrier, and the mechanical oil pump is configured to be driven by power that is transmitted from the carrier.

3. The hybrid vehicle according to claim 2, further comprising:

an electric oil pump configured to generate hydraulic pressure for activating the power transmission unit and the clutch; and a controller configured to control the electric oil pump, the controller being configured to, at the time of switching from series-parallel mode to series mode, change a rotation speed of the electric oil pump based on whether a rotation speed of the internal combustion engine is lower than a rotation speed of the first rotary electric machine, wherein the series-parallel mode is a mode in which the hybrid vehicle travels in a state where the power transmission unit is placed in the non-neutral state and the clutch is placed in the released state, and the series mode is a mode in which the hybrid vehicle travels in a state where the power transmission unit is placed in the neutral state and the clutch is placed in the engaged state.

4. The hybrid vehicle according to claim 3, wherein the controller is configured to, at the time of switching from the series-parallel mode to the series mode, increase the rotation speed of the electric oil pump when the rotation speed of the internal combustion engine is lower than the rotation speed of the first rotary electric machine, and decrease the rotation speed of the electric oil pump when the rotation speed of the internal combustion engine is higher than the rotation speed of the first rotary electric machine.

* * * * *